(12) United States Patent
Minamikawa

(10) Patent No.: US 7,862,075 B2
(45) Date of Patent: Jan. 4, 2011

(54) BRACKET FOR USE IN CURTAIN AIRBAG AND CURTAIN AIRBAG APPARATUS

(75) Inventor: Takeki Minamikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 144 days.

(21) Appl. No.: 12/318,763

(22) Filed: Jan. 8, 2009

(65) Prior Publication Data
US 2009/0278336 A1 Nov. 12, 2009

(30) Foreign Application Priority Data
May 8, 2008 (JP) .............................. 2008-122796

(51) Int. Cl.
*B60R 21/20* (2006.01)
*B60R 21/213* (2006.01)

(52) U.S. Cl. ................................ 280/730.1; 280/728.2

(58) Field of Classification Search .............. 280/728.2, 280/730.2; 24/197, 200; 248/300, 309.1
See application file for complete search history.

(56) References Cited

U.S. PATENT DOCUMENTS

| | | | | |
|---|---|---|---|---|
| 6,293,581 | B1* | 9/2001 | Saita et al. ............... | 280/730.2 |
| 7,077,424 | B2* | 7/2006 | Inoue ....................... | 280/730.2 |
| 7,156,413 | B2* | 1/2007 | Fischer et al. ............ | 280/728.2 |
| 7,159,894 | B2* | 1/2007 | Ronne et al. ............. | 280/728.2 |
| 7,328,911 | B2* | 2/2008 | Chapman ................. | 280/728.2 |
| 2003/0042712 | A1* | 3/2003 | Henderson et al. ....... | 280/728.2 |
| 2004/0012172 | A1* | 1/2004 | Deligny et al. ........... | 280/728.2 |
| 2004/0070184 | A1* | 4/2004 | Takahara ................. | 280/730.2 |
| 2004/0136812 | A1* | 7/2004 | Kawai et al. ............. | 411/508 |
| 2005/0029778 | A1* | 2/2005 | Weber et al. ............. | 280/728.2 |
| 2005/0173902 | A1* | 8/2005 | Boxey ...................... | 280/730.2 |
| 2006/0197316 | A1 | 9/2006 | Watanabe | |
| 2007/0063490 | A1* | 3/2007 | Minamikawa ........... | 280/728.2 |
| 2007/0222192 | A1* | 9/2007 | Yamagiwa et al. ....... | 280/730.2 |
| 2009/0091102 | A1* | 4/2009 | Okimoto .................. | 280/728.2 |
| 2010/0127484 | A1* | 5/2010 | Son ......................... | 280/730.2 |

FOREIGN PATENT DOCUMENTS

| | | |
|---|---|---|
| DE | 10 2005 051 728 A1 | 5/2007 |
| EP | 1 484 222 A1 | 12/2004 |
| EP | 1 764 271 A2 | 3/2007 |
| JP | 2004-196262 | 7/2004 |
| JP | 2004-210099 A | 7/2004 |
| JP | 2004-231147 A | 8/2004 |
| JP | 2005-104234 A | 4/2005 |
| JP | 2006-69248 | 3/2006 |
| JP | 2008-12976 | 1/2008 |
| WO | WO 02/28690 A1 | 4/2002 |
| WO | WO 2007/025662 A1 | 3/2007 |

\* cited by examiner

*Primary Examiner*—Paul N Dickson
*Assistant Examiner*—James English
(74) *Attorney, Agent, or Firm*—Manabu Kanesaka

(57) ABSTRACT

A curtain airbag bracket is used to assemble a curtain airbag having an attaching piece, and an inflator connected to the curtain airbag, and to attach the same to a vehicle body. The inflator is connected to the curtain airbag for supplying a pressurized fluid for developing the curtain airbag. The curtain airbag bracket includes an airbag bracket having an airbag-attaching portion for attaching the attaching piece of the curtain airbag to hold the curtain airbag, and an inflator bracket coupled with the airbag bracket for holding the inflator so that the inflator is substantially in parallel with and adjacent to the curtain airbag. The airbag-attaching portion faces the inflator bracket with a gap therebetween.

9 Claims, 14 Drawing Sheets

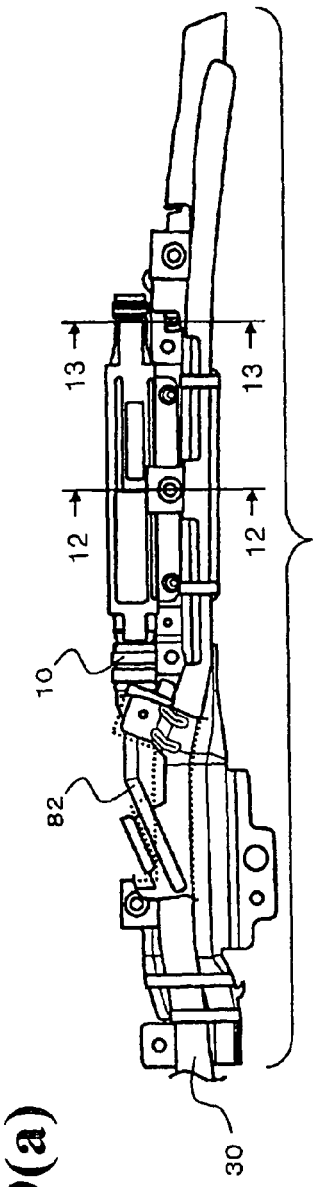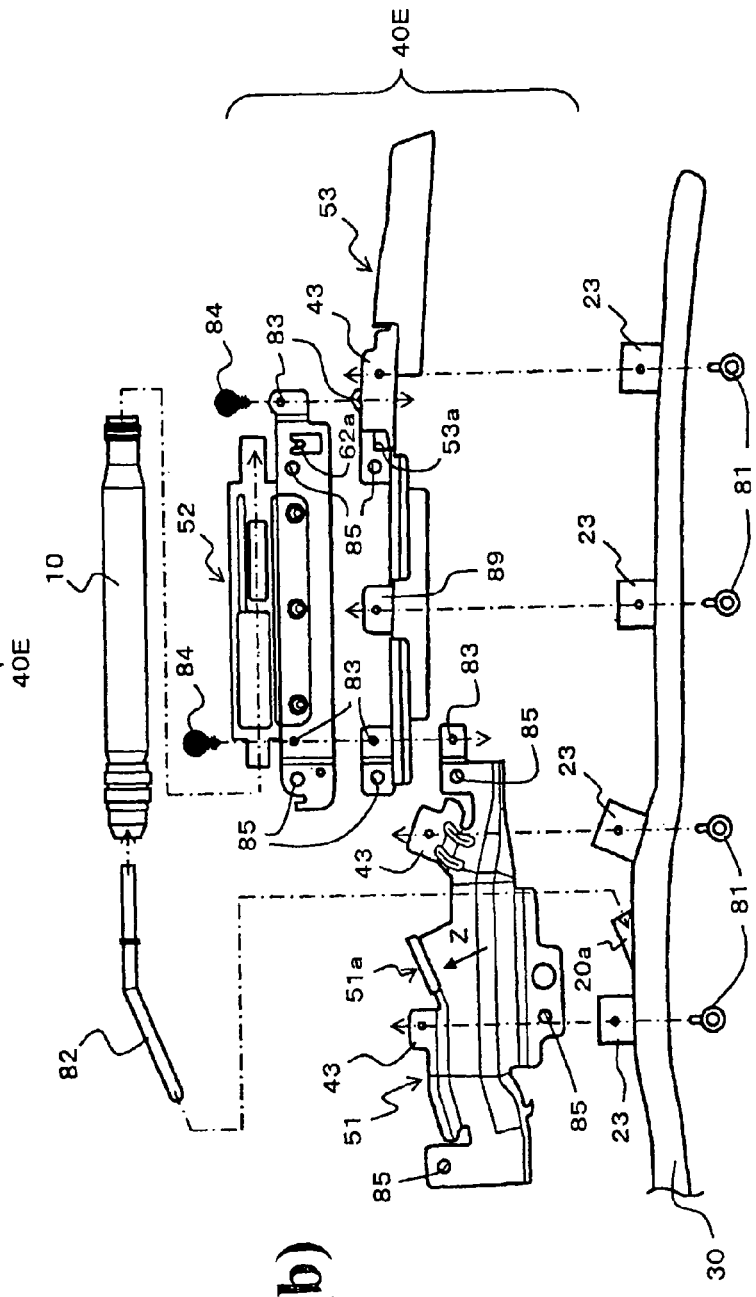
Fig. 9(a)
Fig. 9(b)

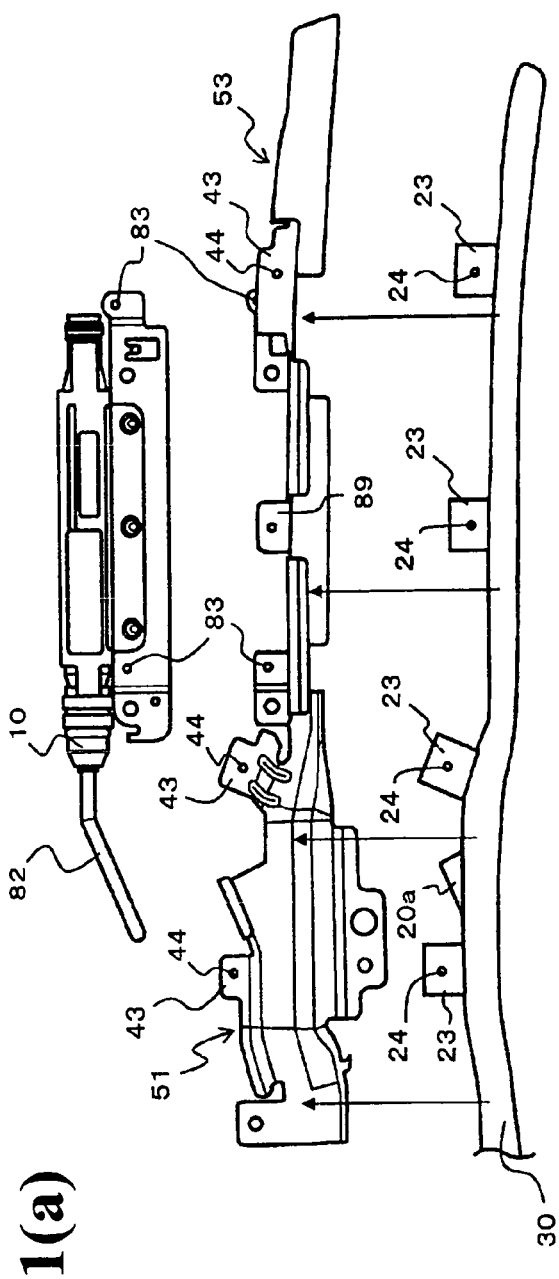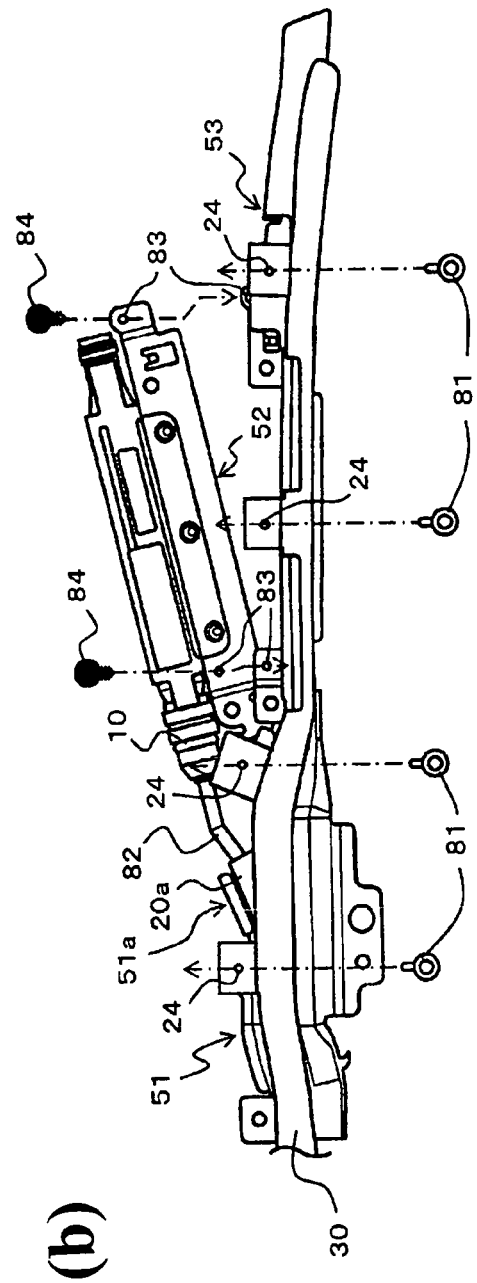
Fig. 11(a)
Fig. 11(b)

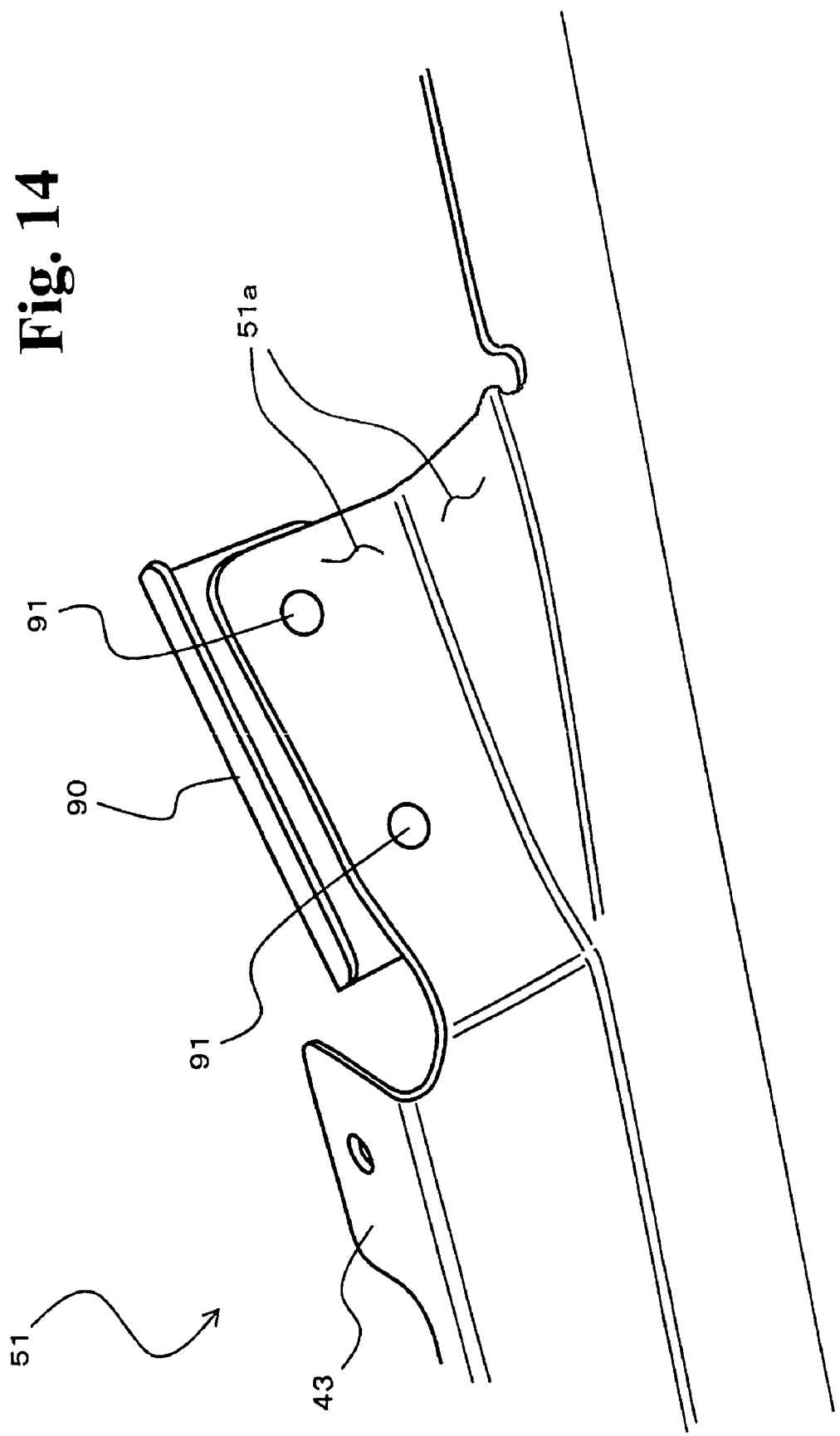

BRACKET FOR USE IN CURTAIN AIRBAG AND CURTAIN AIRBAG APPARATUS

BACKGROUND OF THE INVENTION AND RELATED ART STATEMENT

The present invention relates to a bracket for use in a curtain airbag for attaching a curtain airbag to be developed in a curtain-like manner along a side of a vehicle body of an automobile or the like and a curtain airbag apparatus provided with the same.

Hitherto, as one of airbags to be expanded and developed in the event of collision of a vehicle such as an automobile or the like, a so-called curtain airbag to be developed in a curtain-like manner along a side of a vehicle body is well known. This curtain airbag is configured such that, normally, the same is housed along an intersecting corner portion of a ceiling portion and a side surface portion of an interior of the vehicle body while being folded back into an elongated shape, and upon receiving an impact from the side by a side collision or the like, the gas is introduced into an inside thereof, and the curtain airbag is expanded and developed downward along the side of the vehicle body.

In general, this curtain airbag is attached to the vehicle body on both lateral sides in a vehicle width direction by fixing a plurality of attaching pieces (attaching piece portions) provided at an edge portion of an airbag at a predetermined pitch to a plurality of respective attaching portions provided at the intersecting corner portion of the aforementioned vehicle interior via brackets for use in the curtain airbag, for holding the attaching pieces with bolts or the like.

Further, there is sometimes a case that the bracket for use in the curtain airbag to be attached to one place is formed to have a large dimension in a front-and-rear direction of the vehicle for the purpose of securing a holding strength and/or a fixing strength of the curtain airbag corresponding to an attaching position in the vehicle interior, and so forth. As for a bracket having such a large-length construction, there is one having a construction in which brackets, which are previously divided into plurality in the front-and-rear direction of the vehicle in consideration of making small for transportation and easiness for attaching to vehicles, are attached to a vehicle as one bracket while being integrally combined as one bracket. Such a bracket for use in a curtain airbag is described in, for example, Patent Document 1 (Japanese Unexamined Patent Application Publication No. 2008-12976 (FIG. 12 etc.))

In recent years, along with a trend of multi-row seats in a vehicle interior (three rows or more), it is required to develop a curtain airbag across an entire interior in a front-and-rear direction of the vehicle, and therefore it becomes difficult to arrange an inflator on an extension of the curtain airbag. Consequently, a construction, wherein the inflator is provided so as to overlap with the curtain airbag, is frequently adopted. Further, size reduction of an entire apparatus including the curtain airbag, the inflator, and a bracket is required.

An object of the present invention is to provide a bracket for use in a curtain airbag and a curtain airbag apparatus capable of arranging an inflator in an overlapping manner with the curtain airbag, thereby reducing the size of the entire apparatus.

Further objects and advantages of the invention will be apparent from the following description of the invention.

SUMMARY OF THE INVENTION

In order to achieve the aforementioned object, a bracket for use in a curtain airbag according to a first aspect of the invention is that in a bracket for use in a curtain airbag for attaching a curtain airbag developing in a curtain-like manner along a side of a vehicle body and an inflator for supplying a pressurized fluid for expanding and developing the curtain airbag, to the vehicle body upon combining the curtain airbag and the inflator, the bracket includes an airbag bracket including an airbag-fixing-and-attaching portion for attaching an attaching piece formed at an edge portion of the curtain airbag, and an inflator bracket holding the inflator in an arrangement approximately in parallel with and adjacent to the curtain airbag upon being coupled with the airbag bracket. The airbag-fixing-and-attaching portion of the airbag bracket is formed in an arrangement facing an outer peripheral portion of the inflator held by the inflator bracket, while being spaced apart therefrom.

In general, a curtain airbag to be developed in a curtain-like manner along a side of a vehicle body is attached to the vehicle body by fixing a plurality of attaching pieces provided at an edge portion of the curtain airbag at predetermined pitch to an airbag-fixing portion provided at an intersecting corner portion of the ceiling portion and a side surface portion of an interior of the vehicle body via the bracket for use in the curtain airbag. At this moment, the attaching piece of the curtain airbag is configured to be attached to an airbag-fixing-and-attaching portion of the bracket for use in the curtain airbag.

Here, in the first aspect of the invention, the airbag-fixing-and-attaching portion of the airbag bracket is formed in the arrangement facing the outer peripheral portion of the inflator held by the inflator bracket while being spaced apart therefrom. Thereby, even when the bracket for use in the curtain airbag composed of the airbag bracket and the inflator bracket has a construction for supporting and combining the inflator and the curtain airbag in an arrangement in parallel with each other and adjacent thereto, an appropriate separating distance can constantly be secured between the airbag-fixing-and-attaching portion of the airbag bracket and the outer peripheral portion of the inflator, and a normal attaching state of the curtain airbag to the vehicle body can be maintained. As a result, the inflator can be arranged so as to overlap with the curtain airbag, and a reduction of size of an entire apparatus can be realized.

The bracket for use in the curtain airbag of a second aspect of the invention is such that in the aforementioned first invention, the aforementioned inflator bracket is provided with a latching pawl capable of latching for temporarily fixing the inflator bracket to the vehicle body at an overlapping portion with the aforementioned airbag bracket, and the aforementioned airbag bracket is provided with a visual confirmation hole capable of visually confirming a latching state of the aforementioned latching pawl at an overlapping portion with the aforementioned inflator bracket.

Thereby, since an attaching operation (or assembling operation) for the entire bracket for use in the curtain airbag including the inflator bracket can be performed while constantly and visually confirming the temporarily fixing state of the airbag bracket through a visual confirmation hole by previously latching the same to the vehicle body with the latching pawl, the attaching workability for the curtain airbag can be improved.

According to a third aspect of the invention, in the aforementioned first or second aspects, the aforementioned inflator bracket is provided with a retainer for holding the aforementioned inflator, and a retainer bracket fastened to the retainer with a fastening implement and coupled with the aforementioned airbag bracket. At a fastening position in the aforementioned retainer bracket to which the aforementioned retainer is fastened, a displacement fastening portion formed of a step-like shape capable of housing a projecting dimension of the aforementioned fastening implement is formed, relative to an installation surface at which the retainer bracket is installed to the aforementioned vehicle body while facing the vehicle body.

Thereby, even in a case that the retainer is coupled with the displacement fastening portion of the retainer bracket via a bolt, the end portion of the bolt can be suppressed to be projected from the installation surface at which entire retainer bracket is installed to the vehicle body. Thereby, the entire bracket for use in the curtain airbag can appropriately be attached.

A fourth aspect of the invention is that in the aforementioned first through third aspects of the invention, a vibration-limiting portion for limiting a vibration at a combining portion by surrounding at least a part of an outer periphery of the combining portion of the aforementioned inflator and the aforementioned curtain airbag is provided, and that a limitation-holding bracket coupled with at least one of the aforementioned inflator bracket and the aforementioned airbag bracket is provided.

Thereby, when a pressurized fluid is supplied into the curtain airbag by an ignition activation of the inflator, an excessive vibration of the combining portion of the inflator and the curtain airbag can be limited by the vibration-limiting portion. This results in reduction of a load applied to the curtain airbag.

In order to achieve the aforementioned object, the curtain airbag apparatus according to a fifth aspect of the invention is that a curtain airbag apparatus includes a curtain airbag to be developed in a curtain-like manner along a side of a vehicle body, an inflator for supplying a pressurized fluid for expanding and developing the aforementioned curtain airbag, and a bracket for use in the curtain airbag for attaching the aforementioned curtain airbag and the aforementioned inflator to the aforementioned vehicle body upon combining the bracket and the inflator, in which the bracket for use in the aforementioned curtain airbag includes an airbag bracket including an airbag-fixing-and-attaching portion for attaching an attaching piece formed at an edge portion of the aforementioned curtain airbag, and an inflator bracket holding the aforementioned inflator in an arrangement approximately in parallel with the aforementioned curtain airbag upon being coupled with the aforementioned airbag bracket, and in which the aforementioned airbag-fixing-and-attaching portion of the aforementioned airbag bracket is formed to face an outer peripheral portion of the aforementioned inflator held by the aforementioned inflator bracket, while being spaced apart therefrom.

In the curtain airbag apparatus, a curtain airbag is housed along an intersecting corner portion of a ceiling portion and a side surface portion of an interior of the vehicle body in a state of folded back into an elongated shape. Upon receiving an impact from a side by a side collision or the like, the gas is introduced into an inside of the curtain airbag from the inflator, and the curtain airbag is expanded and developed downward along the side of the vehicle body.

Here, a general curtain airbag apparatus is attached to the vehicle body by fixing a plurality of attaching pieces provided at respective edge portions of the curtain airbag at a predetermined pitch to an airbag-fixing portion provided at the intersecting corner portion of the ceiling portion and the side surface portion of the interior of the vehicle body via the bracket for use in the curtain airbag. The attaching piece of the curtain airbag is configured to be attached to the airbag-fixing-and-attaching portion of the bracket for use in the curtain airbag.

In the fifth aspect of the invention, the airbag-fixing-and-attaching portion of the airbag bracket is formed to face an outer peripheral portion of the inflator held by the inflator bracket while being spaced apart therefrom. Thereby, even when the bracket for use in the curtain airbag composed of the airbag bracket and the inflator bracket has a construction for supporting and combining the inflator and the curtain airbag in an arrangement in parallel with each other and adjacent thereto, an appropriate separating distance can constantly be formed between the airbag-fixing-and-attaching portion of the airbag bracket and the outer peripheral portion of the inflator. Also, a normal attaching state of the curtain airbag to the vehicle body can be maintained. As a result, the inflator can be arranged so as to overlap with the curtain airbag, and the reduction of the size of the entire apparatus can be realized.

According to the present invention, an inflator can be arranged to overlap with a curtain airbag, and the reduction of size of the entire apparatus can be achieved.

BRIEF DESCRIPTION OF THE DRAWINGS

FIGS. 9(a) and 9(b) are a side view and an exploded view illustrating a peripheral portion of a structure bracket in the curtain airbag apparatus.

FIG. 14 is an enlarged perspective view illustrating a part of a third row bracket looking from an arrow Z in FIG. 9(b).

DETAILED DESCRIPTION OF PREFERRED EMBODIMENTS

Hereinbelow, embodiments of the present invention will be explained with reference to the drawings.

Figure 1:
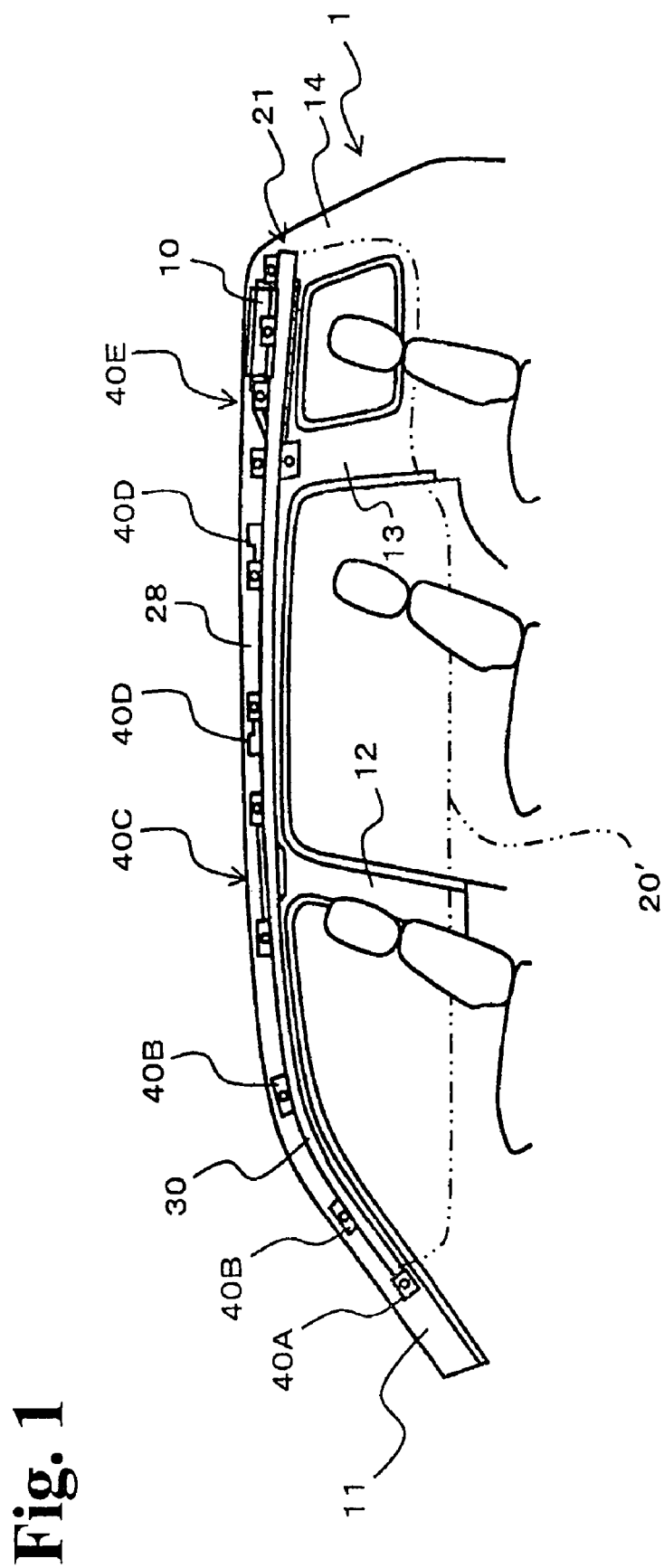
FIG. 1 is an explanatory view schematically illustrating a state in which a curtain airbag apparatus according to an embodiment of the present invention is attached to an automobile.
Figure 2:
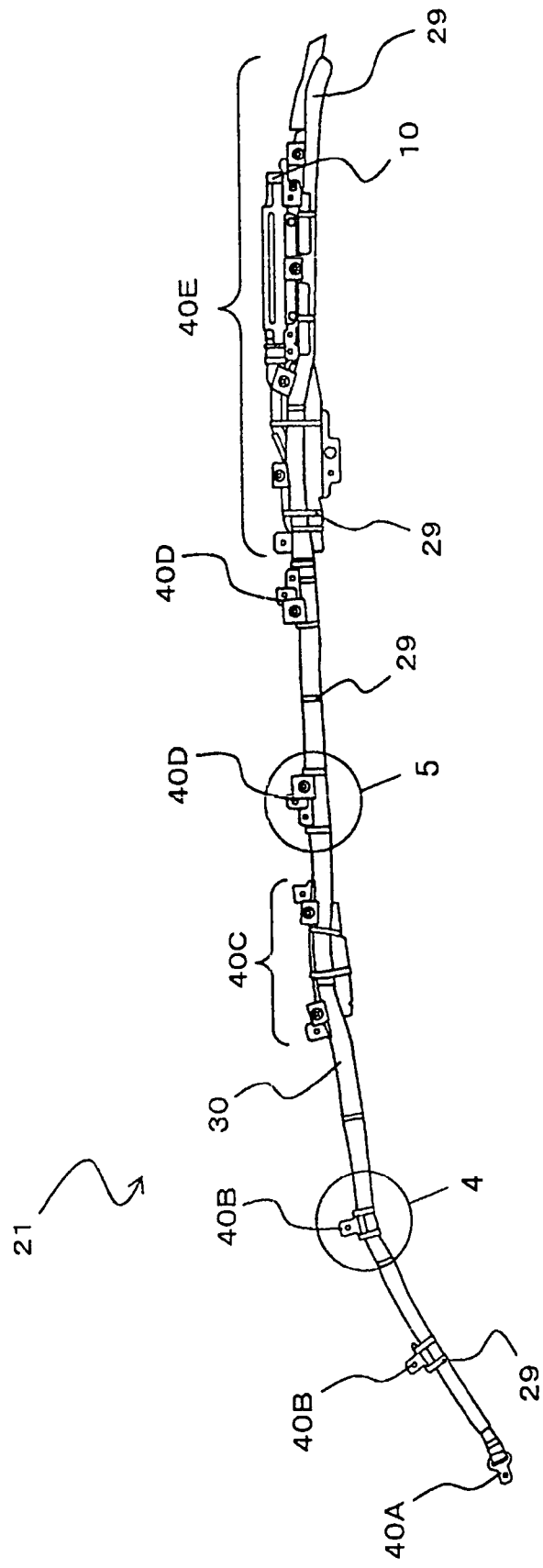
FIG. 2 is an outline side view illustrating the entire curtain airbag apparatus.

FIG. 1 is an explanatory view schematically illustrating a state in which a curtain airbag apparatus according to the embodiment of the present invention is attached to an automobile. Further, FIG. 2 is an outline side view illustrating the concrete entire curtain airbag apparatus of the embodiment. Incidentally, in the description below, as a matter of convenience for explanation, a curtain airbag apparatus and a part thereof attached to a driver's seat side of a vehicle body will be explained while illustrating the same. Unless explained otherwise, the explanation is made such that a left side in the drawing corresponds to a front side of the vehicle body, a right side in the drawing corresponds to a rear side, and an upper and lower direction in the drawing corresponds to an upper and lower direction of the vehicle body. Furthermore, FIG. 3 is a partially broken perspective view illustrating a state at a time when a curtain airbag is housed, and specifically, in this drawing, a direction headed for a lower left of a front side corresponds to a front side of the vehicle body.

Figure 3:
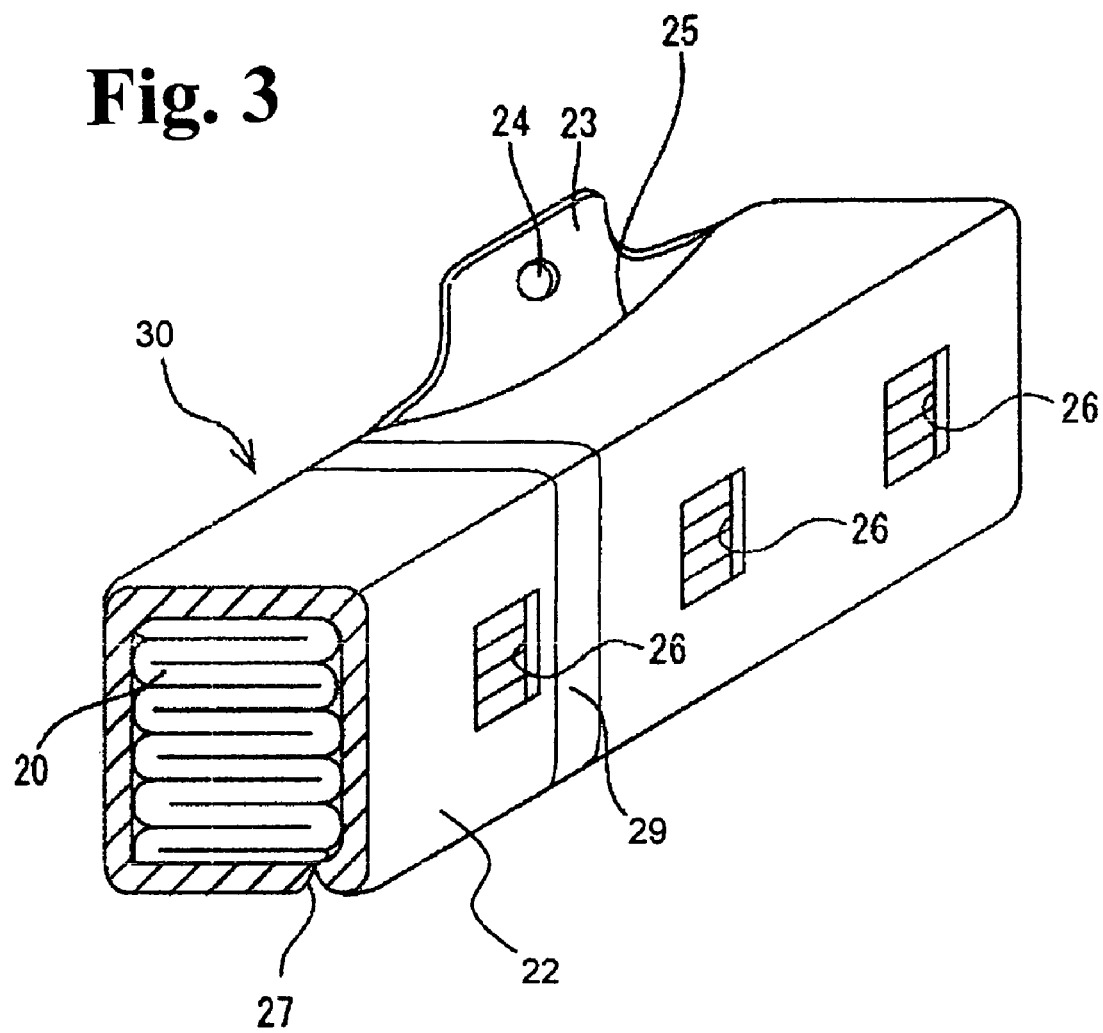
FIG. 3 is a partially broken perspective view illustrating a state where a curtain airbag is housed.

In these FIGS. 1-3, in an interior of a vehicle body 1 of the automobile in the illustrated embodiment, three seat rows are provided in a front-and-rear direction, and at an intersecting corner portion of a ceiling portion and a side surface portion of the interior of the vehicle body 1, a curtain airbag apparatus 21 is provided.

The curtain airbag apparatus 21 is provided with an airbag-holding body 30 (described later in detail) having a construction held by being covered with a covering member 22 capable of rupturing a folded-back entire curtain airbag 20, an inflator 10 for supplying a pressurized gas (pressurized fluid) into the curtain airbag 20 to a position overlapping with the airbag-holding body 30 at a rear side of the curtain airbag apparatus 21, a plurality of brackets 40A, 40B, 40C and 40D for attaching the airbag-holding body 30 to the vehicle body 1, and a structure bracket 40E (bracket for use in a curtain airbag, described later in detail) for attaching the airbag-holding body 30 and the inflator 10 upon coupling with each other to the vehicle body 1. Moreover, in the event of a side collision, an overturn, or the like of the automobile, a sensor (not shown) for sending an ignition signal to the inflator 10 upon detecting the collision detects the collision, and a start signal is inputted from an inflator control circuit (not shown) to an initiator (not shown) of the inflator 10. Then, the aforementioned initiator starts, the inflator 10 is activated, the pressurized gas for expanding an airbag is blown out, the curtain airbag 20 is expanded and developed in a lower direction as indicated by a chain double-dashed line 20' illustrated in FIG. 1, and a head portion of an occupant is restrained.

In the airbag-holding body 30, as illustrated in FIG. 3, the curtain airbag 20 is held by the covering member 22 in a state of being folded back upon overlapping in an upper and lower direction in a bellows-like manner so as to have a rectangular shape in cross-section. An ear-shaped attaching piece 23 projecting from an edge portion at an upper end of the curtain airbag 20 is projected upward while passing through an elongated opening portion (a slot) 25 that is provided on a vehicle side of an upper surface portion of the covering member 22.

The attaching piece 23 is provided in plurality along a longitudinal direction of the curtain airbag 20, and at each attaching piece 23, an insertion hole 24 for an attaching implement (for example, a rivet 81, an attaching bolt, or the like illustrated in FIG. 7 and FIGS. 9(a), 9(b), described later) is provided. At a side surface portion on a vehicle interior side of the covering member 22, a plurality of openings 26 in an upper and lower direction is provided along the longitudinal direction. The folded-back state of the curtain airbag 20 can be visually observed from outside the covering member 22 through the opening 26.

At a corner portion of the covering member 22 on the vehicle interior side where a side surface portion and a bottom surface portion on the vehicle interior side intersect, a rupturing portion 27 serving as a rupturing point of the covering member 22 at a time when the airbag 20 is expanded is provided. An outer periphery of the covering member 22 is wound and held at a predetermined pitch by a plurality of rupturable bands 29. Further, as described above, an entire structure of the covering member 22 and the curtain airbag 20 held inside thereof constructs the airbag-holding body 30.

The airbag-holding body 30 is formed to have a shape inflected in an approximately bow-like manner in a longitudinal direction, and fixed to an airbag-fixing portion 28 provided at the intersecting corner portion of the ceiling portion and the side surface portion of the interior of the vehicle body 1, in concrete terms, at a bow-shaped portion from an A-pillar 11 (front pillar) along a roof side rail 2 via the brackets 40A, 40B, 40C, 40D, and the structure bracket 40E.

The bracket 40A is fixed to an inside of the A-pillar 11 while being attached to the attaching piece 23 that is positioned at a tip end on the front side of the vehicle body of the airbag-holding body 30. In this bracket 40A, although a detailed structure thereof is not specifically shown, a turn-back hole for inserting and turning back the attaching piece 23 provided at a tip end portion on the front side of the vehicle body of the curtain airbag 20 in the airbag-holding body 30, is formed. The bracket 40A is attached to a tip end of the curtain airbag 20 by inserting the attaching piece 23 into the turn-back hole, and turning back, and riveting the portion that is thereby overlapped, using a riveting implement (for example, a rivet or the like).

The bracket 40C is, in this embodiment, provided at a B-pillar 12 positioned at the second place from the front side of the vehicle body 1 in the aforementioned airbag-fixing portion 28, and two brackets 40B, 40B are, in this embodiment, provided between the bracket 40A and the bracket 40C in the airbag-fixing portion 28. Incidentally, the bracket 40C is, although illustration of a detailed structure thereof is not shown, a bracket provided with two airbag-attaching portions 43 for attaching the attaching piece 23 of the curtain airbag 20. Furthermore, in the bracket 40B, although description is made later in detail, a turn-back hole for inserting and tuning back the attaching piece 23 of the curtain airbag 20 in the airbag-holding body 30 is formed in a similar manner as that of the aforementioned bracket 40A. The bracket 40B is attached to the tip end of the curtain airbag 20 by turning back the attaching piece 23 that is inserted into the turn-back hole, and riveting the portion of the attaching piece 23 that is turned back and thereby overlapped, using the riveting implement (refer to FIG. 4, FIG. 5, and FIGS. 6(a), 6(b), 6(c) described later).

Two brackets 40D, 40D are provided between the B-pillar 12 (second pillar) positioned at the second place from the front side of the vehicle body 1 and a C-pillar 13 (third pillar) positioned at the third place from the front side of the vehicle body 1 in the aforementioned airbag-fixing portion 28 in this embodiment. This bracket 40D is, although description is made later in detail, provided with a plurality of (two in this embodiment) airbag-attaching portions 43 for attaching the attaching piece 23 of the curtain airbag 20 in the airbag-holding body 30, and is constructed such that the attaching piece 23 can be selectively attached to a plurality of airbag-attaching portions 43 (refer to FIG. 7 and FIGS. 8(a), 8(b), 8(c) described later).

The structure bracket 40E is, in this embodiment, provided between the C-pillar 13 (third pillar) positioned at the third place from the front side of the vehicle body 1 and a D-pillar (rear pillar) 14 at the rear side of the vehicle body 1 in the aforementioned airbag-fixing portion 28. This structure bracket 40E is, although detailed description is made later, provided with the airbag-attaching portions 43 in plurality (four in this embodiment) for attaching the attaching piece 23 of the curtain airbag 20 in the airbag-holding body 30, and is further constructed such that the inflator 10 can be held and fixed in an arrangement in parallel with and adjacent to the airbag-holding body 30 (refer to FIGS. 9(a), 9(b), FIG. 12, and FIG. 13 described later).

Figure 4:
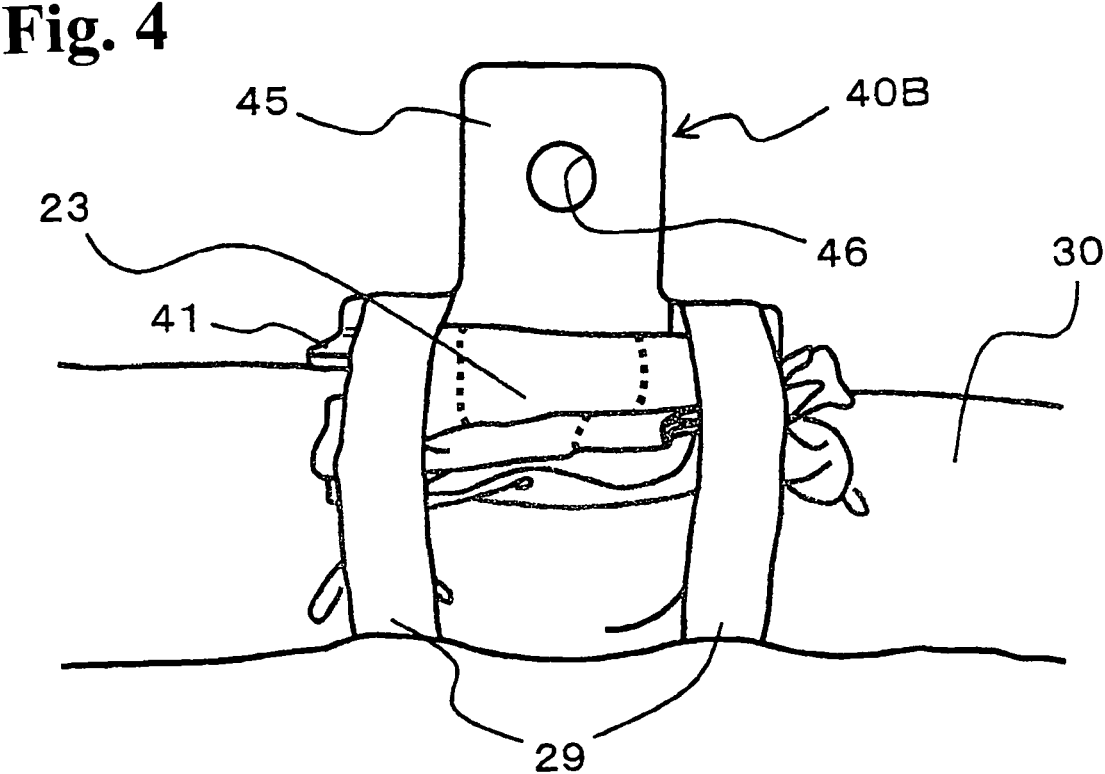
FIG. 4 is an enlarged view illustrating a portion 4 in FIG. 2.
Figure 5:
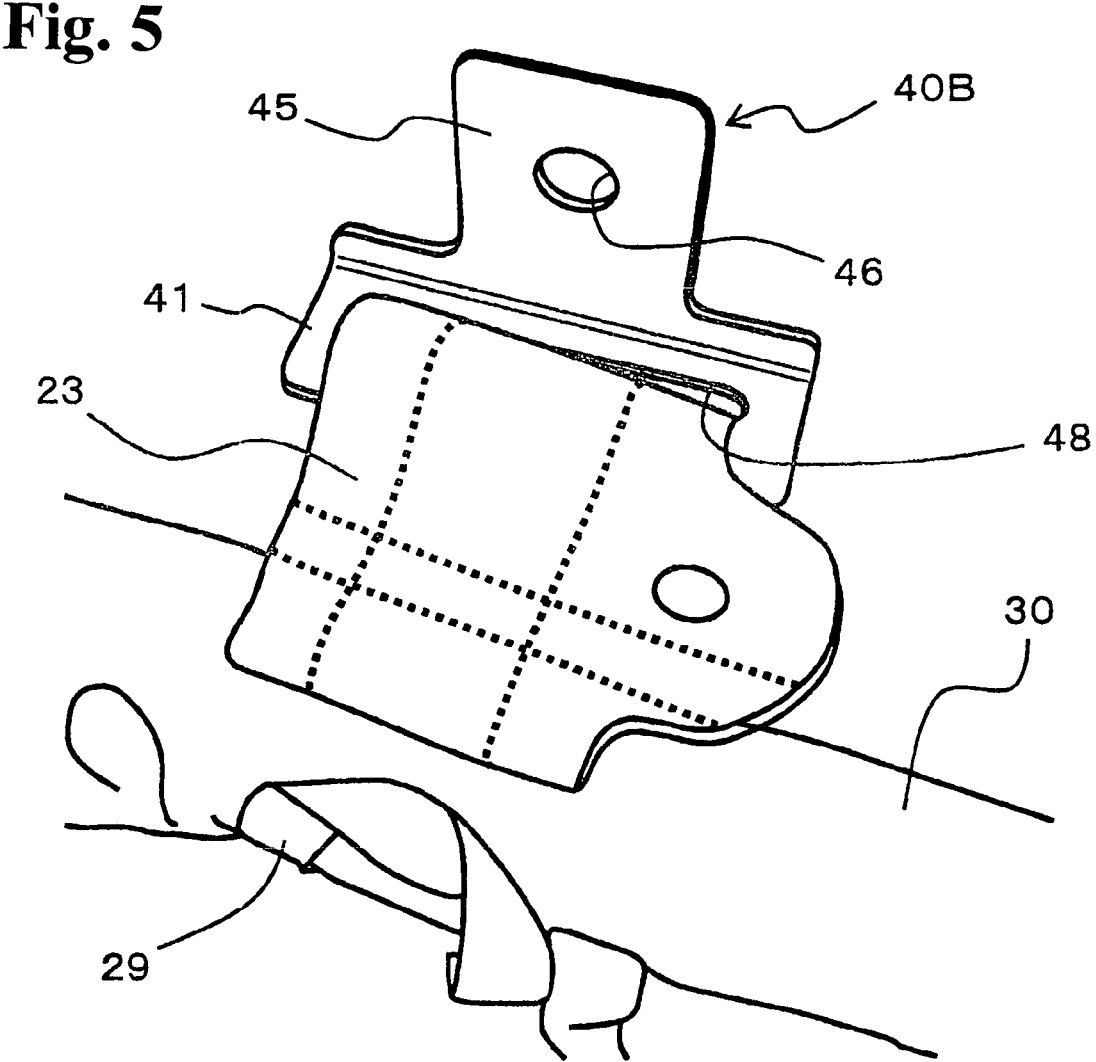
FIG. 5 is a view illustrating a state in which an attaching piece is developed while breaking a band of the portion 4 in FIG. 2.
Figure 6A:
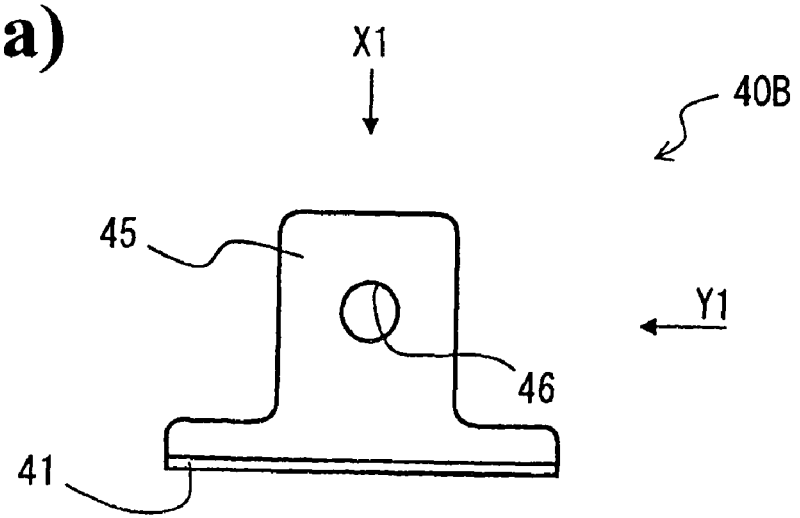
FIGS. 6(a), 6(b) and 6(c) are a front view, a top plan view, and a side view, respectively, illustrating a detailed structure of a bracket.

FIG. 4 is an enlarged view illustrating a portion 4 including the bracket 40B in FIG. 2. FIG. 5 is a view illustrating a state in which the attaching piece 23 is developed while breaking a band 29 of a portion 5. FIG. 6(a) is a front view illustrating a detailed structure of only the bracket 40B, FIG. 6(b) is a top view of the bracket 40B looking from a direction X1 in FIG. 6(a), and FIG. 6(c) is a side view of the bracket 40 looking from a direction Y1 in FIG. 6(a).

Figure 6B:
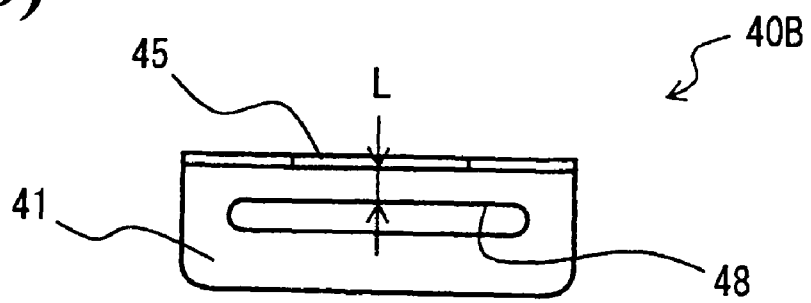
Figure 6C:
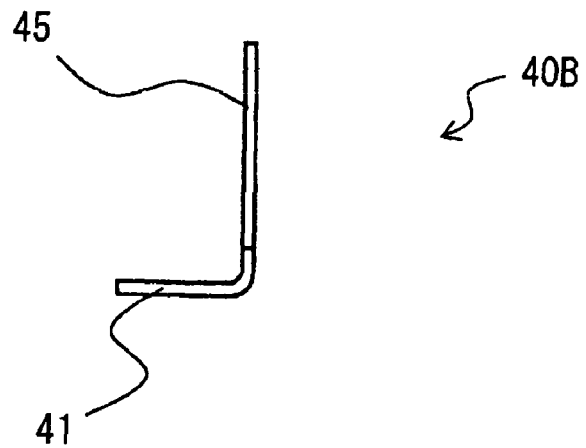

As illustrated in FIG. 4, FIG. 5, and FIGS. 6(a), 6(b), 6(c), the bracket 40B is provided with a vehicle-body-attaching portion 45, which is formed by bending upward on a vehicle-interior outside (one side in the width direction, and a back-side of a paper surface in FIG. 6(a), an upper side in FIG. 6(b), and a right side in FIG. 6(c)) of a bottom plate portion 41 formed to have an approximately rectangular shape, for attaching the bracket 40B to the vehicle body 1. Thereby, an entire bracket 40B is formed to have an approximately L shape looking from a side as illustrated in FIG. 6(c). In the vehicle-body-attaching portion 45, a width dimension of a part of a lower side thereof has the same dimension as a length in a longitudinal direction of the bottom plate portion 41, and most part on the upper side in relation thereto is formed to have a relatively narrow width dimension at a center position of the aforementioned part of the lower side.

One vehicle-body-attaching portion 45 is provided so that the center position thereof is located on a center surface A. In the vehicle-body-attaching portion 45, an insertion hole 46 for inserting an attaching implement (for example, a rivet, an attaching bolt, or the like) for fixing the bracket 40B to the vehicle body 1 is provided in a manner such that the center position thereof is located on a center line of an entire vehicle-body-attaching portion 45. By inserting the aforementioned attaching implement into the insertion hole 46 of the vehicle-body-attaching portion 45, and fitting into the fitting hole (not shown) provided in the aforementioned airbag-fixing portion 28 on the vehicle body 1 side (in a case of the attaching bolt, by fastening to the screw hole), the bracket 40B is fixed to the vehicle body 1.

Furthermore, in the bracket 40B, a turn-back hole 48 formed to have a slit shape having a length shorter than an entire length in a longitudinal direction of the bottom plate portion 41 is formed at a center position in a width direction of the bottom plate portion 41 in an arrangement in parallel with the longitudinal direction of the bottom plate portion 41. The bracket 40B is attached to the curtain airbag 20 by inserting the attaching piece 23 of the curtain airbag 20 in the airbag-holding body 30 into the turn-back hole 48 and turning back, and riveting the portion that is thereby overlapped, using the riveting implement (for example, a rivet or the like) (refer to FIG. 4). Moreover, the bracket 40B can be attached to the airbag-holding body 30 being in close contact therewith (refer to FIG. 4) by fixing a remainder portion of the attaching piece 23 upon folding back the same and winding the band 29 therearound.

When the pressurized gas supplied from the inflator 10 flows into the curtain airbag 20 in the event of the side collision, the overturn, or the like of the automobile, the band 29 and the covering member 22 are ruptured first, and the folded-back attaching piece 23 is stretched, and the curtain airbag 20 is expanded and developed downward. A reaction due to rapid tension force is applied to the bracket 40B, however the tension force of the reaction is directly applied to the bottom plate portion 41 where the attaching piece 23 is attached, and the bottom plate portion 41 is a portion that is bent perpendicularly to the vehicle-body-attaching portion 45, which is fixed to the vehicle body 1. Therefore, the tension force of the reaction can be absorbed by a plastic deformation of the bottom plate portion 41. As a result, an appropriate attaching state of the curtain airbag 20 to the vehicle body 1 can be maintained.

Further, by forming the turn-back hole 48 of the bottom plate portion 41 in the arrangement that is spaced apart from the bending portion between the bottom plate portion 41 and the vehicle-body-attaching portion 45 by a distance L, a point where the tension force of the reaction is applied can be spaced apart from the bending portion. That is, a sufficient width of the plastic deformation can be applied to the bottom plate portion 41.

Figure 7:
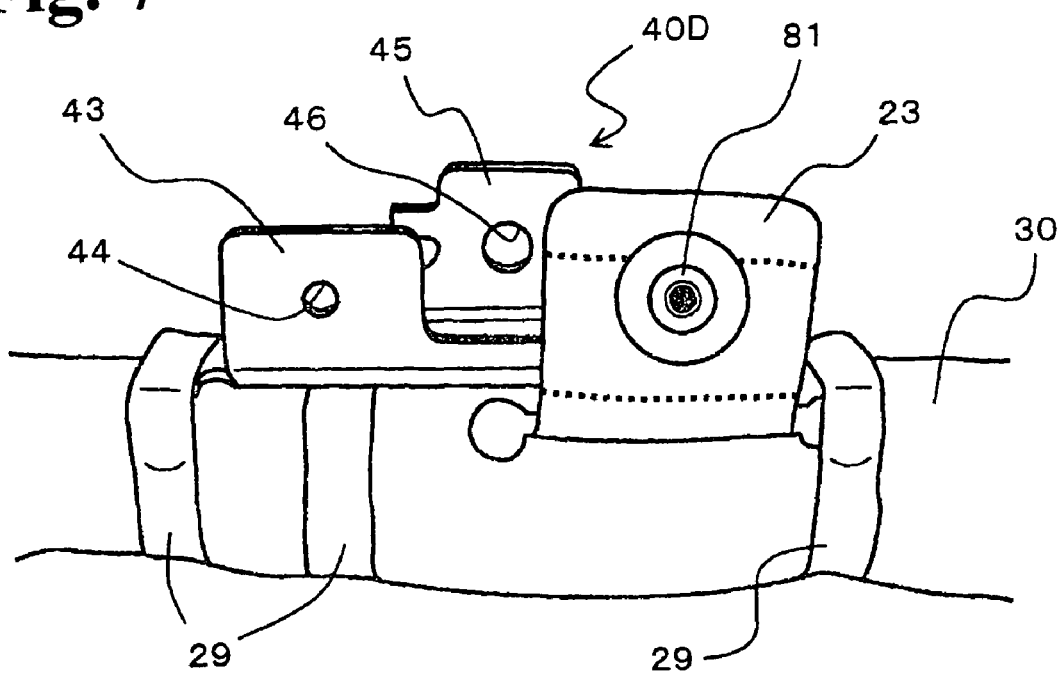
FIG. 7 is an enlarged view illustrating a portion 5 in FIG. 2.
Figure 8A:
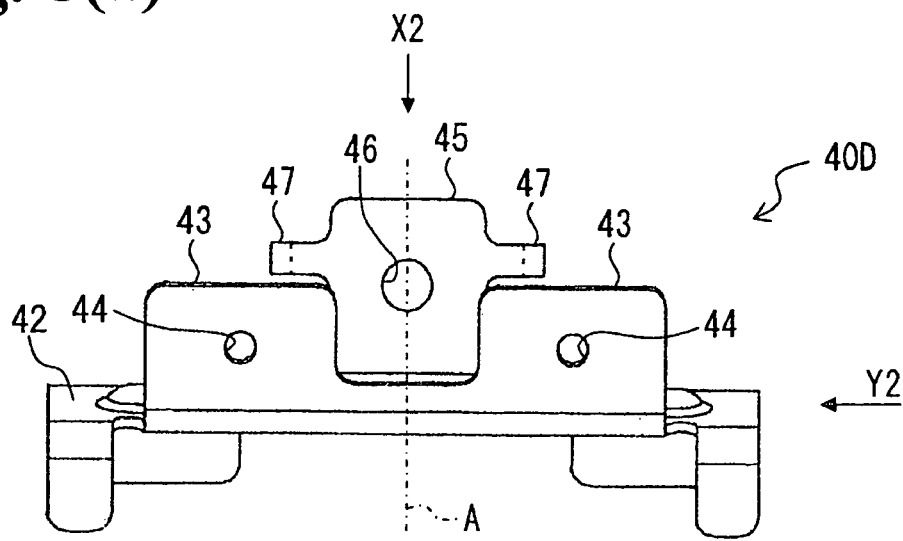
FIGS. 8(a), 8(b) and 8(c) are a front view, a top plan view, and a side view, respectively, illustrating a detailed structure of a bracket.
Figure 8B:
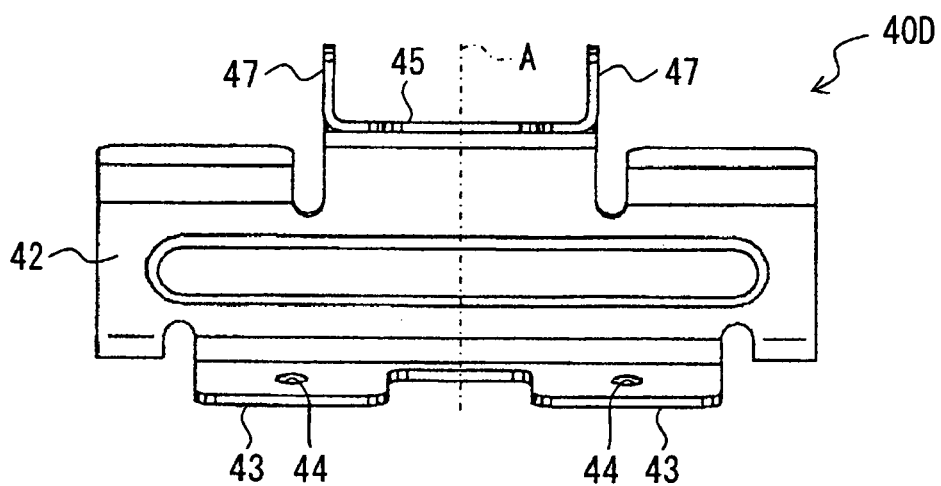
Figure 8C:
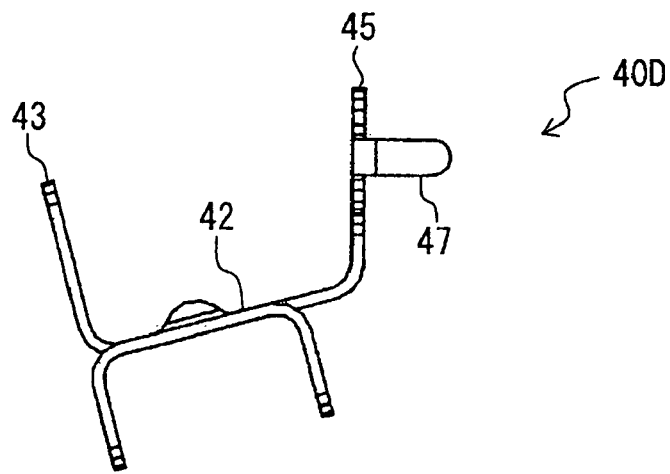

FIG. 7 is an enlarged view illustrating a portion 5 including the bracket 40D in FIG. 2, FIG. 8(a) is a front view illustrating a detailed structure of only the bracket 40D, FIG. 8(b) is a top view illustrating the bracket 40D looking from a direction X2 in FIG. 8(a), and FIG. 8(c) is a side view illustrating the bracket 40D looking from a direction Y2 in FIG. 8(a).

As illustrated in FIG. 7, FIG. 8(a) through FIG. 8(c), the bracket 40D is formed to have an approximately bilaterally-symmetric shape with respect to a center surface A serving as a center position in the front-and-rear direction of the vehicle (a left and right direction in FIG. 8(a) and FIG. 8(b)) corresponding to a longitudinal direction of the curtain airbag 20 in an attaching state of the curtain airbag 20 (a state shown in FIG. 1). This bracket 40D is provided with a plurality of airbag-attaching portions 43 (two brackets 40D, 40D are provided in this embodiment), which is formed by bending upward on the inside of the vehicle interior of the bottom plate portion 42 (front side of the paper surface in FIG. 8(a), lower side in FIG. 8(b), and left side in FIG. 8(c)), for attaching the attaching piece 23 that is formed in the curtain airbag 20. The airbag-attaching portions 43, 43 are provided in the same number (one each in this embodiment) at each position having the same distance from the center surface A in each of the left and right sides so as to form the bilaterally symmetric shape with respect to the aforementioned center surface A. In the respective airbag-attaching portions 43, insertion holes 44 for inserting the attaching implement (for example, rivet 81, attaching bolt, or the like illustrated in FIG. 7 or in later-described FIGS. 9(a), 9(b)) for fixing the attaching piece 23 of the curtain airbag 20 to the airbag-attaching portions 43 are respectively provided at positions having the same distance from the aforementioned center surface A. The attaching piece 23 of the curtain airbag 20 can be selectively attached to two of the airbag-attaching portions 43 of the bracket 40D by inserting the aforementioned attaching implement into the insertion hole 24 of the attaching piece 23 and the insertion hole 44 of the airbag-attaching portion 43 (in a case of the attaching bolt, by screwing with the nut (not shown) after insertion) in a state that the attaching piece 23 of the curtain airbag 20 is selectively overlapped with either one of two airbag-attaching portions 43 (in the embodiment shown in FIG. 7, the front side of the vehicle body and the right side in the drawing).

Furthermore, the bracket 40D is provided with the vehicle-body-attaching portion 45, which is formed by bending upward in the same manner as the aforementioned airbag-attaching portion 43 on the vehicle body side of the bottom plate portion 42 (back side of the paper surface in FIG. 8(a), upper side in FIG. 8(*b*), and right side in FIG. 8(*c*)), for attaching the bracket 40D to the vehicle body 1. One vehicle-body-attaching portion 45 is provided so that the center position thereof is located on the aforementioned center surface A. In the vehicle-body-attaching portion 45, an insertion hole 46 for inserting the attaching implement (for example a rivet, an attaching bolt, or the like) for fixing the bracket 40D to the vehicle body 1 is provided in a manner such that the center position thereof is located on the aforementioned center surface A. The bracket 40D is fixed to the vehicle body 1 by inserting the aforementioned attaching implement into the insertion hole 46 of the vehicle-body-attaching portion 45 and fitting into the fitting hole (not shown) provided in the aforementioned airbag-fixing portion 28 on the vehicle body side (in a case of the attaching bolt, by screwing into the screw hole).

Moreover, the bracket 40D is provided with projecting portions 47, 47 which are formed in the same number (one each in this embodiment) on each of the left and right sides of the vehicle-body-attaching portion 45 by bending toward the vehicle body side, and which can be fitted into fitting holes (not shown) provided in the aforementioned airbag-fixing portion 28 on the vehicle body side. When the curtain airbag 20 in the airbag-holding body 30 is attached to the vehicle body 1 via the bracket 40D, the aforementioned projecting portion 47 is fitted to the fitting hole provided in the aforementioned airbag-fixing portion 28 on the vehicle body side. Thereby, the bracket 40D can be prevented from rotating about the vehicle-body-attaching portion 45 (in more accurate terms, around the insertion hole 46) due to rotation force generated by the attaching piece 23 of the curtain airbag 20, which is fixed to any one of the left and right airbag-attaching portions 43 of the bracket 40D.

FIG. 9 (*a*) is a side view illustrating an outline of a peripheral portion of a structure bracket 40E in the curtain airbag apparatus 21, and FIG. 9(*b*) is an exploded view illustrating the peripheral portion of the structure bracket 40E as well. Incidentally in FIG. 9(*a*), a combination state of the airbag-holding body 30 with the inflator 10 is illustrated upon breaking a part of the airbag-holding body 30.

As illustrated in FIG. 9(*a*) and FIG. 9(*b*), an entire structure bracket 40E is a structure that is elongated in the front-and-rear direction of the vehicle body (left and right direction in the drawing), and is mainly formed to have a construction in which three bracket elements of a third row bracket (limitation-holding bracket) 51, an inflator bracket 52, and a rear pillar bracket (airbag bracket) 53 respectively elongated in the front-and-rear direction of the vehicle body are coupled and assembled in an approximately straight line-like arrangement.

The third row bracket 51 is a bracket element constituting a front side portion of the vehicle body (left side portion in the drawing) in the entire structure bracket 40E, and is to be attached to a position corresponding to an upper part of the third seat row (alternatively, a position corresponding to the C-pillar 13) in the vehicle body 1 (refer to FIG. 1). Further, the third row bracket 51 is provided for holding a periphery of a fluid-supplying inlet 20*a* of the curtain airbag 20 at which the curtain airbag 20 in the airbag-holding body 30 is combined with the inflator 10 via a fluid-supplying pipe 82.

The rear pillar bracket 53 is a bracket element constituting a portion on the rear side of the vehicle body in relation to the third row bracket 51 (right side in the drawing) in the entire structure bracket 40E, and is to be attached to a position corresponding to a rear side of the C-pillar 13 to the D-pillar 14 (rear pillar) in the vehicle body 1. Further, the rear pillar bracket 53 is provided for holding an end portion on the rear side of the vehicle body of the airbag-holding body 30 (end portion on the right side in the drawing).

The inflator bracket 52 is a bracket element arranged on the rear side of the vehicle body (right side in the drawing) of the aforementioned third row bracket 51 while being overlapped with the aforementioned rear pillar bracket 53 in the front-and-rear direction of the vehicle body, and the inflator 10 is held at an upper part thereof. Furthermore, as described later in detail, the inflator bracket 52 is composed of a retainer 61 holding the inflator 10 at the upper part thereof and a retainer bracket 62 fastened to the retainer 61 at a lower part thereof (refer to FIGS. 10(*a*), 10(*b*) described later).

One coupling hole 83 is formed in each of both ends in the front-and-rear direction of the vehicle body of the retainer bracket 62. Coupling holes 83 are formed at positions in the rear pillar bracket 53, respectively corresponding to the two of the coupling holes 83 of the retainer bracket 62. A coupling hole 83 is formed at an end portion on the rear side of the vehicle body of the third row bracket 51 corresponding to the coupling hole 83 at the end portion on the front side of the vehicle body of the retainer bracket 62. Moreover, the third row bracket 51, the inflator bracket 52, and the rear pillar bracket 53 are integrally coupled with each other. And, the structure bracket 40E is constructed by penetrating rivets 84 (in this embodiment, resin-made clips on which a thread for preventing dropping off is formed) to a position where the respectively corresponding coupling holes 83 are individually overlapped and conformed, and by fixing the same with rivets 84.

Further, in the vicinity of the respective coupling holes 83 of the respective bracket elements 51, 52, and 53, attaching holes 85 are formed, and the corresponding coupling holes 85 form the attaching hole 85 for fixing the structure bracket 40E to the vehicle body 1 in conformity with each other in a state where the respective bracket elements 51, 52, and 53 are coupled to serve as the structure bracket 40E. Furthermore, an attaching hole 85 is also formed in each of the bracket elements itself, and the structure bracket 40E is fixed to the vehicle body 1 by inserting an attaching implement (for example, a rivet, an attaching bolt, or the like, not specifically shown) through the attaching hole 85 and fitting into a fitting hole (not shown) provided in the aforementioned airbag-fixing portion 28 on the vehicle body side (in a case of the attaching bolt, by screwing to the screw hole).

Moreover, the third row bracket 51 and the rear pillar bracket 53 are provided with the airbag attaching portions 43, respectively, for attaching the attaching piece 23 formed in the curtain airbag 20 in the airbag-holding body 30 at appropriate places (two places each in this embodiment), respectively. In the respective airbag-attaching portions 43, the insertion holes 44 for inserting the attaching implement (for example, rivet 81, attaching bolt, or the like in the illustrated example) for fixing the attaching piece 23 of the curtain airbag 20 to the airbag-attaching portions 43 are respectively provided. The attaching piece 23 of the curtain airbag 20 is attached to each of the airbag-attaching portions 43 of the structure bracket 40E by inserting the rivet 81 serving as an attaching implement into the insertion hole 24 of the attaching piece 23 and the insertion hole 44 of the airbag-attaching portion 43 in a state of overlapping the attaching pieces 23 of the curtain airbag 20 with the respectively corresponding airbag-attaching portions 43, and swaging the same (in a case of the attaching bolt, by screwing with the nut (not shown) after inserting).

The inflator 10 having a tubular shape as a whole is, as described above, held in an inside of the retainer 61 positioned above the inflator bracket 52. Thereby, the inflator 10 is fixed in the arrangement in parallel with and adjacent to the airbag-holding body 30 (and the curtain airbag 20 inside thereof). Further, one end of the aforementioned fluid-supplying pipe 82 having a tight-lipped mouth-shape as a whole is inserted into a side end portion of the front side of the vehicle body of the inflator 10, and the other end thereof is inserted into the fluid-supplying inlet 20*a* of the curtain airbag 20. Thereby, the inflator 10 and the curtain airbag 20 are formed to have a state in which each of the insides thereof is allowed to communicate with.

Figure 10A:
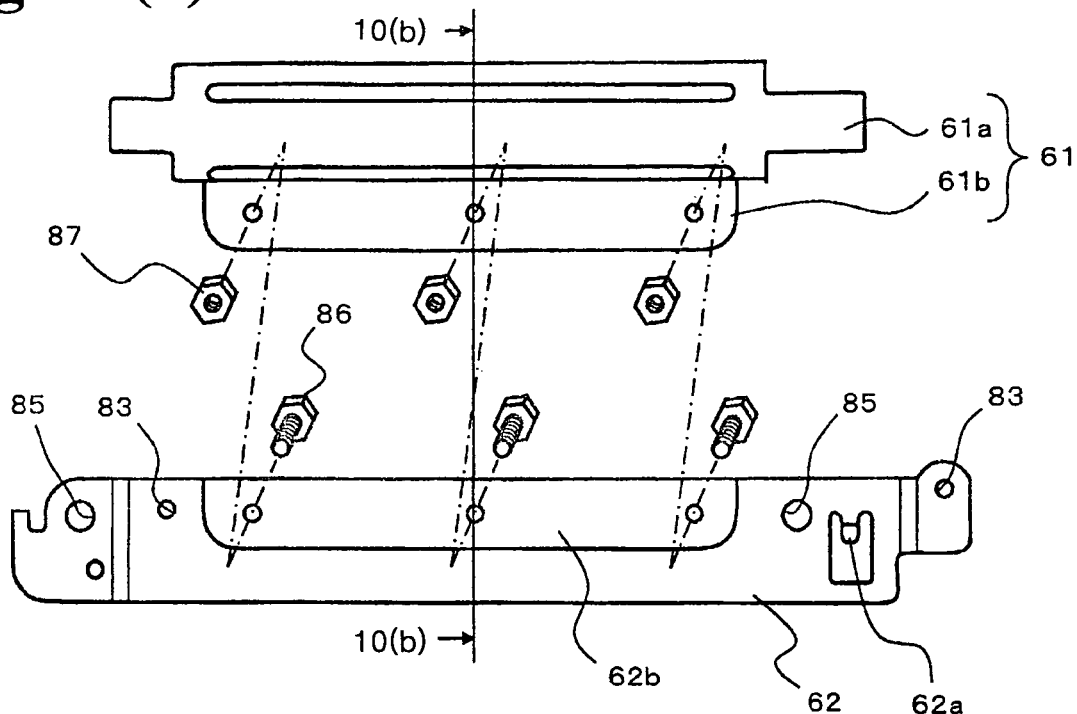
FIG. 10(a) is an exploded view illustrating the inflator bracket 52.
Figure 10B:
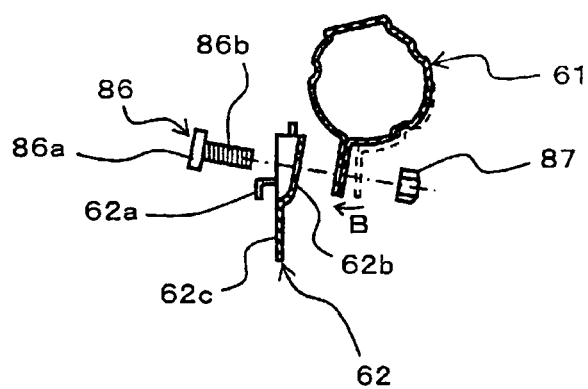
FIG. 10(b) is a cross-sectional view illustrating the inflator bracket 52 taken along line 10(b)-10(b) in FIG. 10(a) FIGS. 11(a) and 11(b) are views illustrating a concrete work process for holding an airbag-holding body by coupling three bracket elements.

FIG. 10(*a*) is an exploded view illustrating the inflator bracket 52 and FIG. 10(*b*) is a cross-sectional view illustrating the inflator bracket 52 taken along a line 10(*b*)-10(*b*) in FIG. 10(*a*).

As illustrated in FIGS. 10(*a*), 10(*b*), as described above, the inflator bracket 52 is composed of the retainer 61 holding the inflator 10 at the upper part thereof and the retainer bracket 62 fastened to the retainer 61 at the lower part thereof.

The retainer 61 is provided with a retainer body portion 61*a* having an approximately tubular shape by bending a thin plate, and a retainer-attaching portion 61*b* having an approximately rectangular shape by bending both ends of the thin plate downward and adjusting the same.

The retainer bracket 62 is a thin plate having an approximately rectangular shape as a whole, and as described above, the coupling holes 83 and the attaching holes 85 are respectively formed at both ends thereof. Further, in this embodiment, a latching pawl 62*a* is formed by bending a part of the retainer bracket 62, which is punching-processed, between the coupling hole 83 and the attaching hole 85 on the rear side (right side in the drawing) of the vehicle body of the retainer bracket 62. Furthermore, at a center position in a longitudinal direction of the retainer bracket 62, a displacement fastening portion 62*b* at which the retainer-attaching portion 61*b* of the aforementioned retainer 61 is fastened by a bolt (fastening implement) 86 and a nut (fastening implement) 87 is formed (incidentally, although the construction is individually illustrated in FIG. 10(*a*) for concretization, in this embodiment, the bolt 86 is integrally formed with the displacement fastening portion 62*b* by welding). The displacement fastening portion 62*b* is formed to have a size slightly larger than the retainer-attaching portion 61*b* of the retainer 61, and is formed to have an approximately similar shape, and is also formed to have a step relative to a flat surface therearound.

Incidentally, as described above, in the retainer 61, the retainer body portion 61*a* is formed by bending a thin plate into an approximately tubular shape, and two retainer-attaching portions 61*b*, 61*b* are formed by bending both ends of the retainer body portion 61*a* downward, respectively. However, each of two sheets of the retainer-attaching portions 61*b*, 61*b* is spaced apart at a sufficient distance, as indicated by a chain line in the drawing, before the retainer 61 is attached to the retainer bracket 62, and an inner diameter of the retainer body portion 61*a* is formed slightly larger than an outer diameter of the inflator 10 so that the inflator 10 (not specifically shown) is inserted in a loosely fitting manner into an inside thereof with ease. Further, after the inflator 10 is inserted into the inside of the retainer body portion 61*a*, an inner peripheral surface of the retainer body portion 61*a* fixes the inflator 10 upon appropriately grabbing the same by firmly attaching and overlapping the two sheets of retainer-attaching portion 61*b*, 61*b* as indicated by an arrow B in the drawing.

In this embodiment, the displacement fastening portion 62*b* is formed with a step-like shape capable of housing a projecting dimension of a head portion 86*a* of the bolt 86 (the thickness dimension of the head portion 86*a*), relative to an installation surface 62*c* on a side where the retainer bracket 62 is installed while facing the vehicle body 1 (the backside in FIG. 10(*a*), and the left side in FIG. 10(*b*)), when the structure bracket 40E is attached to the vehicle body 1.

Two sheets of the retainer-attaching portions 61*b*, 61*b* of the retainer 61 are overlapped with the displacement fastening portion 62*b* on a surface of an opposite side of the aforementioned installation surface 62*c* of the retainer bracket 62. (the front side in FIG. 10(*a*), and the right side in FIG. 10(*b*)) remaining firmly attached with each other. A stud 86*b* of the bolt 86 is inserted into each of fastening holes 88 formed at three places of the respective retainer-attaching portions 61*b* and the displacement fastening portion 62*b* respectively adjusted in an arrangement of even distances from the aforementioned installation surface 62*c* side of the retainer bracket 62. Further, the head portion 86*a* of the bolt 86 is fixed to the displacement fastening portion 62*b* by welding. Then, the retainer 61 and the retainer bracket 62 are fastened by fastening the stud 86*b* that is projected toward an opposite side with the nut 87.

FIGS. 11(*a*), 11(*b*) are views illustrating a concrete work process for holding the airbag-holding body 30 by coupling three bracket elements 51, 52, and 53.

Firstly, in FIG. 11(*a*), the inflator bracket 52 is previously assembled upon fastening the retainer 61 and the retainer bracket 62 with the bolts 86 and the nuts 87, as illustrated in FIGS. 10(*a*), 10(*b*) earlier, and the inflator 10 where the fluid-supplying pipe 82 is inserted is attached thereto.

On the other hand, the coupling holes 83 of the respective third row bracket 51 and the rear pillar bracket 53 corresponding to each other (the coupling hole 83 on the rear side of the vehicle body of the third row bracket 51 and the coupling hole 83 on the front side of the vehicle body of the rear pillar bracket 53) are adjusted, and both of the bracket elements 51 and 53 are fixed on a working table (not specifically shown) in a state of arranging on an appropriately one straight line, and the airbag-holding body 30 is held at an appropriate position thereof.

At this point, the third row bracket 51 holds three surfaces of a side surface of the airbag-holding body 30 facing toward an outside of the vehicle interior (backside of the paper surface in FIGS. 11(*a*), 11(*b*)) and both surfaces in the upper and lower directions thereof in a surrounding manner, and the rear pillar bracket 53 holds three surfaces of both side surfaces of the airbag-holding body 30 respectively facing toward the outside of the vehicle interior and an inside of the vehicle interior, and an upper surface thereof in a surrounding manner. In addition, the insertion holes 44 of the airbag-attaching portion 43, which are provided in plurality on the side of the bracket elements 51 and 53, and the respectively corresponding insertion holes 24 of the attaching pieces 23 on the side of the airbag-holding body 30 are adjusted.

Next, as illustrated in FIG. 11(*b*), a tip end of the fluid-supplying pipe 82 is inserted into the fluid-supplying inlet 20*a* provided in the curtain airbag 20 in the airbag-holding body 30 and combined therewith by fastening an outer periphery thereof using an appropriate clamp (not specifically shown) or the like. Incidentally, at this stage, the inflator 10 and the inflator bracket 52 are still rotatable in the fluid-supplying inlet 20*a* as a base point by plasticity of the fluid-supplying inlet 20*a* and the periphery thereof.

Further, in this state, the rivet 81 serving as the attaching implement is penetrated into the insertion holes 44 of the respective airbag-attaching portions 43 on the side of the bracket elements 51 and 53, and the insertion holes 24 of the respective attaching pieces 23 on the side of the airbag-holding body 30, which are adjusted to each other corresponding thereto, and further, the rivet 81 is swaged. Thereby, the airbag-holding body 30 is fixed to the bracket elements 52 and 53. Incidentally, in the swaging work for each of the rivets 81 performed at this time, since the inflator bracket 52 is freely rotatable as described above, the swaging work can easily be performed without receiving any interference.

Finally, the rivets 84 are penetrated into the portions where the coupling holes 83 of the respective bracket elements 51, 52, and 53 corresponding to each other are overlapped and adjusted, and riveted. Thereby, the structure bracket 40E is constructed by integrally coupling the third row bracket 51, the inflator bracket 52, and the rear pillar bracket 53, and the airbag-holding body 30 is held and fixed thereto. Incidentally, as for an arrangement relationship in which the bracket elements 51, 52, and 53 are overlapped with each other, the inflator bracket 52 is positioned at an outermost side of the vehicle interior (backside of the paper surface in FIGS. 11(*a*), 11(*b*)), and the third row bracket 51 and the rear pillar bracket 53 are overlapped in order on the inside of the vehicle interior (front side of the paper surface in FIGS. 11(*a*), 11(*b*)).

Figure 12:
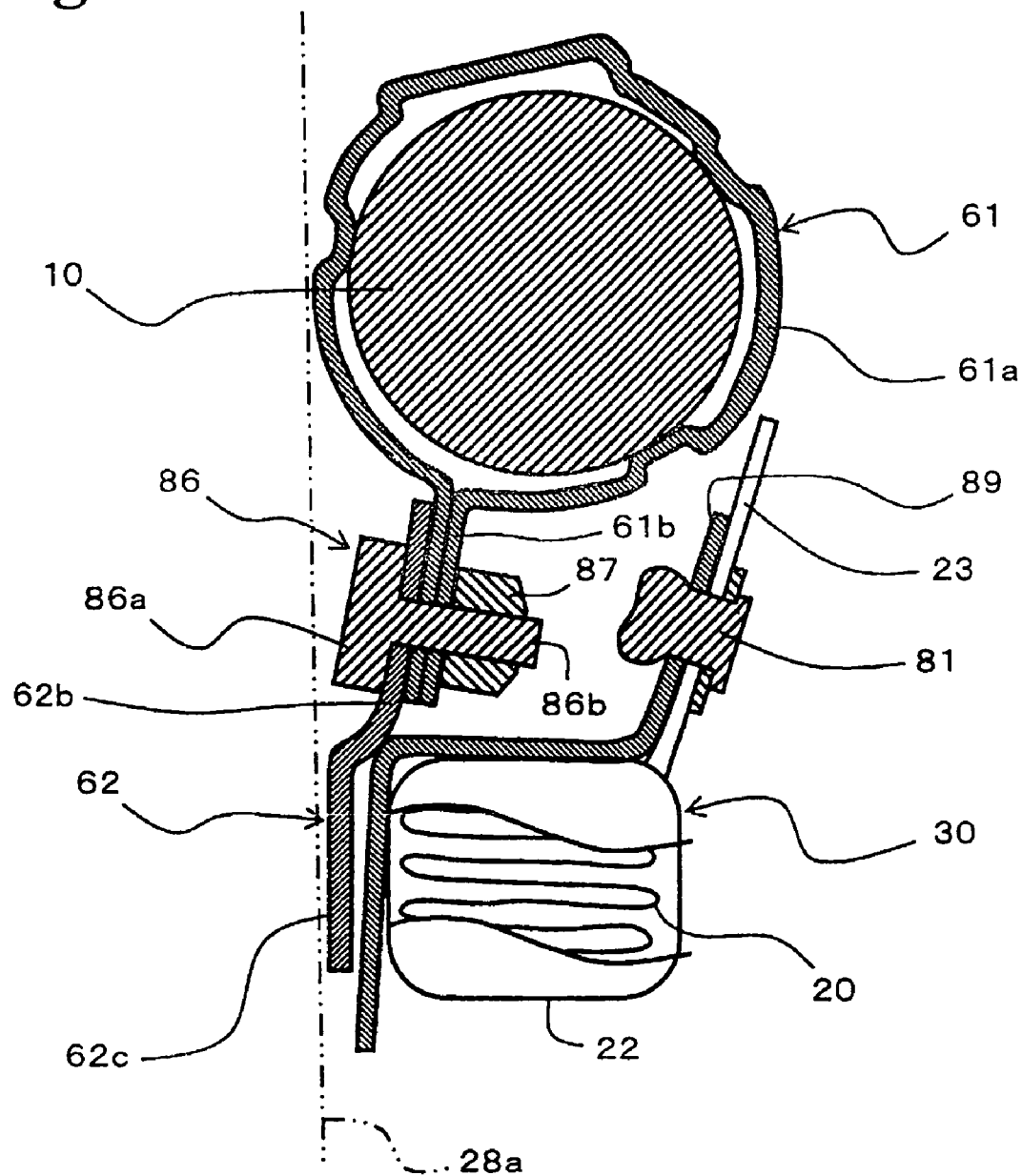
FIG. 12 is a cross-sectional view illustrating the curtain airbag apparatus taken along line 12-12 in FIG. 9(a).

FIG. 12 is a cross-sectional view illustrating the curtain airbag apparatus 21 taken along a line 12-12 in FIG. 9(*a*). In FIG. 12 and FIG. 9(*a*), in an example of the curtain airbag apparatus 21 of the present embodiment, one of two airbag-attaching portions 43 provided in the rear pillar bracket 53 is provided in an arrangement of overlapping with the retainer 61 of the inflator bracket 52 in the front-and-rear direction of the vehicle body, and this airbag-attaching portion is hereinbelow specifically called as a retainer-overlapping position-attaching portion (airbag-fixing-and-attaching portion) 89.

A general inflator 10 is formed to have a tubular shape whose dimension in an axial direction is sufficiently long, and the structure bracket 40E including the inflator bracket 52 in this embodiment holds the inflator 10 in the arrangement in parallel with and adjacent to the airbag-holding body 30. Furthermore, as described above, the structure bracket 40E including the third row bracket 51 holds the peripheral portion of the fluid-supplying inlet 20*a* in the curtain airbag 20, through which the pressurized gas is supplied. Therefore, it is required to arrange the airbag-attaching portions 43 at relatively narrow and consistent pitch in the structure bracket 40E, and it is also required to fix the attaching piece 23 of the curtain airbag 20. Consequently, in many cases, the retainer-overlapping position-attaching portion 89 is provided in an arrangement of overlapping with the retainer 61 in the front-and-rear direction of the vehicle body. Moreover, in the structure bracket 40E of the present embodiment, the retainer-overlapping position-attaching portion 89 is arranged to face an outer peripheral portion of the inflator 10 held by the inflator bracket 52 while being spaced apart therefrom.

As described above, in this embodiment, the retainer-overlapping position-attaching portion (airbag-fixing-and-attaching portion) 89 of the rear pillar bracket 53 and the attaching piece 23 of the curtain airbag 20 corresponding thereto are fixed by swaging with the rivet (attaching implement) 81. Moreover, in this embodiment, a position of a rivet-fixing point in the retainer-overlapping position-attaching portion 89 is in conformity with one of positions of respective fastening points for the retainer 61 and the retainer bracket 62 by the bolt 86 on the inflator bracket 52 in the front-and-rear direction (left and right direction in FIG. 9(*a*) and FIG. 11 (*a*)) of the vehicle body.

Even in a case that the rivet-fixing point and a bolt-fastening point have an arrangement relationship in proximity to each other in the thus completed structure bracket 40E, since the structure bracket 40E has a construction in which each of the bracket elements 51, 52, and 53 originally divided is coupled and assembled, the swaging work using the rivets and the fastening work using the bolts for the inflator bracket 52 and the rear pillar bracket 53 can be performed in a big space at the stage before the same are coupled. This results in a construction having high assembling workability.

Further, as described above, since the retainer-overlapping position-attaching portion 89 is arranged to face the outer peripheral portion of the inflator 10 held by the inflator bracket 52 while being spaced apart therefrom, an appropriate separating distance can constantly be secured between the retainer-overlapping position-attaching portion 89 and the outer peripheral portion of the inflator 10. As a result, a normal attaching state can be maintained while avoiding a contact interference of the rivet 81 of the retainer-overlapping position-attaching portion 89 and the bolt 86 of the inflator bracket 52.

Furthermore, as illustrated in FIG. 12, in a state that the inflator bracket 52 is assembled, the head portion 86*a* of the bolt 86 is housed in the step of the displacement fastening portion 62*b*, there is no possibility that a part of the bolt 86 is projected from the installation surface 62*c* of the retainer bracket 62. Even in a case that the bolt 86 is inserted in an opposite direction (namely, the bolt 86 and the nut 87 are located at positions opposite to each other), the same result can be obtained if the dimension of the step of the displacement fastening portion 62*b* is appropriately set. Moreover, as illustrated in the drawing, in a case that an outer peripheral side surface of the retainer body 61*a* is circumscribed on an extension plane of the installation surface 62*c* of the retainer bracket 62, the structure bracket 40E can be installed in close contact with a front surface 28*a* (imaginarily illustrated by a chain double-dashed line) of the airbag-fixing portion 28 of the vehicle body 1.

Figure 13:
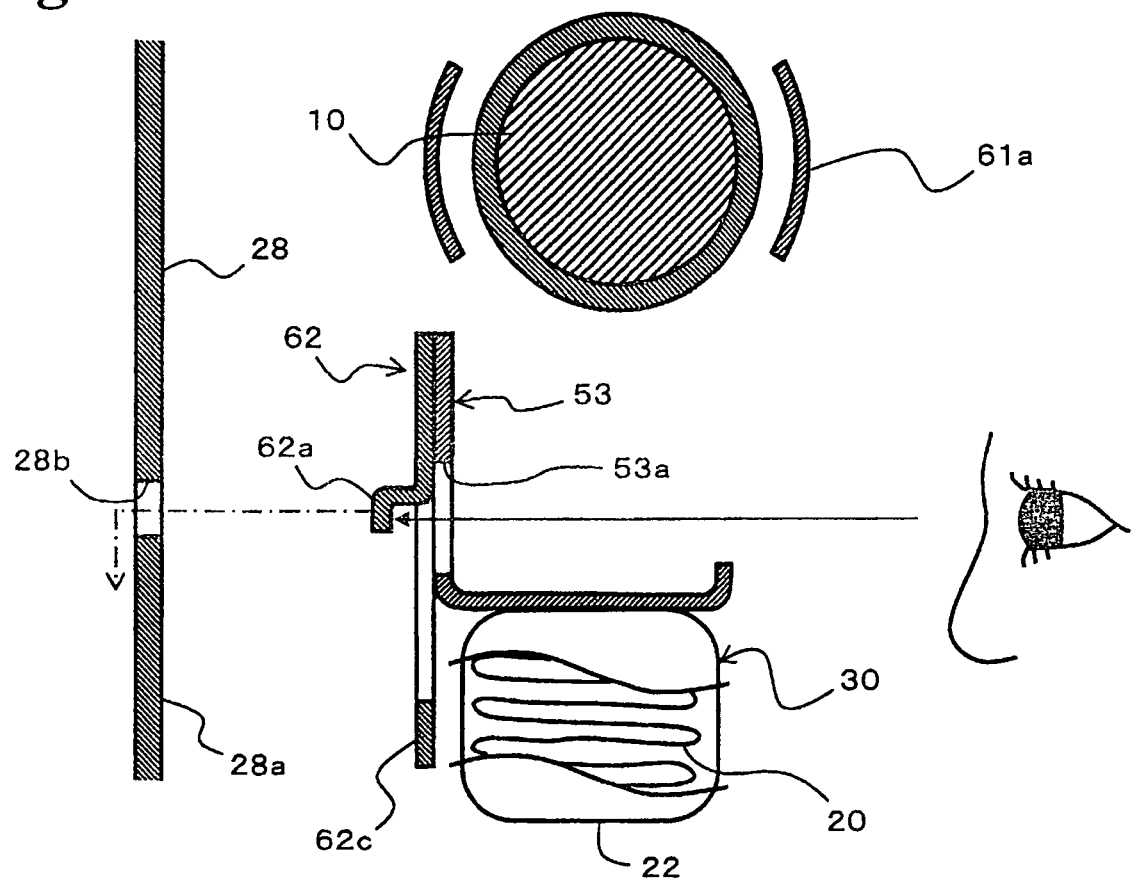
FIG. 13 is a cross-sectional view illustrating the curtain airbag apparatus taken along line 13-13 in FIG. 9(a).

FIG. 13 is a cross-sectional view illustrating the curtain airbag apparatus 21 taken along line 13-13 in FIG. 9(*a*). In FIG. 13, FIG. 9(*a*), and FIG. 9(*b*), the latching pawl 62*a* is formed on the rear side of the vehicle body of the retainer bracket 62 on the inflator bracket 52 as described above (refer to FIG. 10(*a*), 10(*b*)), and a visual confirmation hole 53*a* is formed at a portion overlapping with the latching pawl 62*a* of the retainer bracket 62 corresponding thereto, in the rear pillar bracket 53. Further, in a state that the structure bracket 40E is assembled by coupling the inflator bracket 52 and the rear pillar bracket 53, as illustrated in FIG. 13, the latching pawl 62*a* of the retainer bracket 62 and the visual confirmation hole 53*a* of the rear pillar bracket 53 are overlapped, and the latching pawl 62*a* can easily be visually confirmed from a side surface illustrated in FIG. 9(*a*).

The latching claw 62*a* of the retainer bracket 62 is configured to be able to be inserted and latched, and temporarily fixed to a latching hole 28*b* (square hole for example) formed in the aforementioned airbag-attaching portion 28 on the vehicle body 1 side so that even one worker can easily attach the structure bracket 40E to the airbag-attaching portion 28 on the vehicle body 1 when attaching the structure bracket 40E to the airbag-attaching portion 28. Furthermore, since the worker can constantly and visually confirm the latching state of the latching pawl 62*a* through the visual confirmation hole 53*a*, a stable attaching work can be performed.

FIG. 14 is an enlarged perspective view illustrating a part of the third row bracket looking from an arrow Z in FIG. 9(*b*). In FIG. 14, FIG. 9(*a*), and FIG. 9(*b*), as described above, the third row bracket 51 holds the periphery of the fluid-supplying inlet 20*a* of the curtain airbag 20, and in the third row bracket 51, a vibration-limiting portion 51*a* having a shape that surrounds an upper side and a lateral side (backside in FIG. 9(*a*)) in the outer periphery of the fluid-supplying pipe 82 to be inserted into the fluid-supplying inlet 20*a* is formed.

In this embodiment, a reinforcing plate 90 is further fastened via a rivet 91 to an upper surface of the vibration-limiting portion 51a, and an edge portion of the reinforcing plate 90 is bent downward. Thereby, the fluid-supplying pipe 82 is surrounded from a front side in FIG. 9(a) as well.

According to the curtain airbag apparatus 21 of the present embodiment having the thus explained construction, below described advantages can be obtained.

That is, in the curtain airbag apparatus 21 of the present embodiment, the retainer-overlapping position-attaching portion 89 of the rear pillar bracket 53 is arranged to face the outer peripheral portion of the inflator 10 that is held by the inflator bracket 52 while being spaced apart therefrom. Therefore, even in a construction in which the rear pillar bracket 53 and the structure bracket 40E including the inflator bracket 52 support and fasten the inflator 10 and the airbag-holding body 30 (curtain airbag 20) in the arrangement in parallel with each other and adjacent thereto, an appropriate separating distance can constantly be secured between the retainer-overlapping position-attaching portion 89 of the rear pillar bracket 53 and the outer peripheral portion of the inflator 10. As a result, a normal attaching state of the curtain airbag 20 to the vehicle body 1 can be maintained. Consequently, the inflator 10 can be arranged to be overlapped with the curtain airbag 20, and a small sizing for an entire apparatus can be aimed at.

Further, in the present embodiment, an attaching operation (or assembling operation) for the entire structure bracket 40E including the inflator bracket 52 can be performed while constantly and visually confirming the temporarily fixing state of the rear pillar bracket 53 through the visual confirmation hole 53a by previously latching the same to the vehicle body 1 with the latching pawl 62a. Therefore, the attaching workability for the curtain airbag apparatus 21 can be improved.

Furthermore, in the present embodiment, even in a case that the retainer-attaching portion 61b of the retainer 61 is coupled with the displacement fastening portion 62b of the retainer bracket 62 using the bolt 86, the end portion of the bolt 86 can be suppressed to be projected from the installation surface 62c at which entire retainer bracket 62 is installed to the vehicle body 1. Thereby, the entire structure bracket 40E can appropriately be attached.

Moreover, in the present embodiment, when the pressurized gas is supplied to the fluid-supplying inlet 20a of the curtain airbag 20 through the fluid-supplying pipe 82 by an ignition activation of the inflator 10, an excessive vibration of the fluid-supplying pipe 82 serving as a combining portion of the inflator 10 and the curtain airbag 20 can be limited by the vibration-limiting portion 51a. This results in reduction of a load applied to the curtain airbag 20.

Further, in the bracket 40B in the present embodiment, although the tension force of the reaction generated at a time when the curtain airbag 20 is expanded and developed is directly applied to the bottom plate portion 41, since the bottom plate portion 41 is a portion that is bent orthogonally to the vehicle-body-attaching portion 45, which is fixed to the vehicle body 1, the tension force of the reaction can be absorbed by a plastic deformation of the bottom plate portion 41. As a result, an appropriate attaching state of the curtain airbag 20 to the vehicle body 1 can be maintained.

Furthermore, in the bracket 40B of the present embodiment, the turn-back hole 48 of the bottom plate portion 41 is formed to be spaced apart from the bending portion between the bottom plate portion 41 and the vehicle-body-attaching portion 45 by a distance L. Thereby, the portion where the tension force of the reaction is applied can be separated from the bending portion. That is, a sufficient width of the plastic deformation can be given to the bottom plate portion 41.

Moreover, the bracket 40D of the present embodiment has a construction where two airbag-attaching portions 43 to which the attaching piece 23 of the curtain airbag 20 is attached are provided, and the attaching-piece 23 of the curtain airbag 20 can be selectively attached to any one of two airbag-attaching portions 43. Thereby, the attaching piece 23 can be attached to the airbag-attaching portions 43 while selecting the airbag-attaching portion 43 at a position corresponding to the attaching piece 23 in two of the airbag-attaching portions 43, 43 of the bracket 40D corresponding to a distance between the attaching pieces 23 formed in the curtain airbag 20. That is, for example, in a case that a distance between the attaching pieces 23 of the curtain airbag 20 is relatively narrow, the attaching pieces 23, 23 are respectively attached to the airbag-attaching portions 43, 43 located insides of each of the brackets 40D, 40D (a state shown in FIG. 1), alternatively, for example, in a case that the distance between the attaching pieces 23 of the curtain airbag 20 is relatively wide, the attaching pieces 23 are respectively attached to the airbag-attaching portions 43 located outsides of each of the brackets 40D, 40D. As a result, the same bracket 43D can be applied to a plurality of curtain airbags 20 whose respective attaching pieces 23 have a distance different to each other, thereby improving general versatility.

Moreover, the bracket 40D is formed to have a bilaterally-symmetric shape. Thereby, the same bracket 40D can be applied to both sides in a vehicle-width direction of the vehicle body 1, thereby further improving the general versatility of the bracket 40D.

Further, the bracket 40D is provided with the same number of airbag-attaching portions 43 (one in the aforementioned embodiment) at respective left and right sides. Thereby, while maintaining the bilaterally-symmetric shape of the bracket 40D, a bracket construction including a plurality of (two in the aforementioned embodiment) airbag-attaching portions 43 can be realized.

Furthermore, the bracket 40D is provided with one vehicle-body-attaching portion 45 for attaching the bracket 40D to the vehicle body 1, on the center surface A serving as an approximately center position in the left and right direction. Thereby, while maintaining the bilaterally-symmetric shape of the bracket 40D, the bracket construction including the vehicle-body-attaching portion 45 can be realized. Moreover, since the one vehicle-body-attaching portion 45 is provided, the attaching work for attaching the curtain airbag 20 to the vehicle body 1 can be easier performed compared to a case that the curtain airbag 20 is attached to the vehicle body 1 using a bracket including a plurality of vehicle-body-attaching portions 45.

Moreover, the bracket 40D is provided with the projecting portions 47, 47 for fitting into a fitting hole (not shown) provided in the aforementioned airbag-fixing portion 28 on the vehicle body side on both of left and right sides of the vehicle-body-attaching portion 45. That is, when the attaching piece 23 of the curtain airbag 20 is fixed to any one of left and right airbag-attaching portions 43 of the bracket 40D, rotation force for rotating the bracket 40D about the vehicle-body-attaching portion 45 at an approximately center position in the left and right direction due to the weight thereof is generated. However, in this embodiment, the bracket 40D is prevented from rotating about the vehicle-body-attaching portion 45 by the aforementioned rotation force, by the projecting portions 47, 47 of the bracket 40D that are fitted into the respective fitting holes provided in the vehicle body 1. Further, there is also an advantage that a positioning work can be easily performed when attaching the bracket 40D to the vehicle body side by fitting the projecting portion 47 of the bracket 40D into the fitting hole of the vehicle body 1.

Incidentally, although the above-described embodiment is an example of the preferred configuration of the present invention, the invention is not limited thereto, and various modifications may be embodied within the scope not departing from the spirit of the present invention.

The disclosure of Japanese Patent Application No. 2008-122796 filed on May 8, 2008 is incorporated as a reference.

While the invention has been explained with reference to the specific embodiments of the invention, the explanation is illustrative and the invention is limited only by the appended claims.

What is claimed is:

1. A curtain airbag bracket for assembling a curtain airbag having an attaching piece and an inflator connected to the curtain airbag for supplying fluid thereto, and attaching the same to a vehicle body, comprising:
    an airbag bracket including an airbag-attaching portion for attaching the attaching piece of the curtain airbag to hold the curtain airbag, and retainer-overlapping position-attaching portions; and
    an inflator bracket coupled with the airbag bracket for holding the inflator so that the inflator is substantially held in parallel with and adjacent to the curtain airbag, the inflator bracket comprising a retainer and a retainer bracket, the retainer being adapted to surround and secure the inflator, the retainer bracket being connected to the retainer by a fastening device;
    wherein the airbag-attaching portion faces the retainer bracket of the inflator bracket with a gap therebetween, and the retainer-overlapping position-attaching portions being attached to the retainer bracket.

2. The curtain airbag bracket according to claim 1, wherein the inflator bracket has a latching pawl proximate one end thereof for latching and temporarily fixing the inflator bracket to the vehicle body at an overlapping portion where the inflator bracket overlaps with the airbag bracket, and the airbag bracket has a visual confirmation hole for visually confirming a latching state of the latching pawl at the overlapping portion.

3. The curtain airbag bracket according to claim 1, wherein the retainer bracket has a recess at a fixing position in the retainer bracket to which the retainer is fixed so that the fixing implement does not project from an installation surface at which the retainer bracket is installed to the vehicle body.

4. The curtain airbag bracket according to claim 1, further comprising a vibration-limiting bracket connected to at least one of the inflator bracket and the airbag bracket and having a vibration-limiting portion covering at least a part of an outer periphery of a connecting portion of the inflator and the curtain airbag so as to limit a vibration at the connecting portion.

5. The curtain airbag bracket according to claim 4, wherein said airbag bracket has an elongated shape so that the inflator bracket is disposed above the airbag bracket, and is arranged to hold the airbag under the airbag bracket.

6. The curtain airbag bracket according to claim 3, wherein the recess forms a step-like fixing portion descending from the installation surface, said installation surface facing the vehicle body.

7. A curtain airbag apparatus, comprising:
    the curtain airbag;
    the inflator; and
    the curtain airbag bracket according to claim 1.

8. The curtain airbag bracket according to claim 1, wherein the inflator bracket is located above the airbag bracket.

9. The curtain airbag bracket according to claim 1, wherein the retainer of the inflator bracket is located at an upper end of the retainer bracket of the inflator bracket and directly above the gap and the airbag bracket.

* * * * *